United States Patent [19]
Jariabek

[11] Patent Number: 5,904,865
[45] Date of Patent: May 18, 1999

[54] EDM CONTROL BY ADJUSTING THE ON-TIME POWER LEVEL

[76] Inventor: George V. Jariabek, 4949 Newcastle Ave., Encino, Calif. 91316

[21] Appl. No.: 08/826,936

[22] Filed: Apr. 8, 1997

[51] Int. Cl.$^6$ ...................................................... B23H 1/02
[52] U.S. Cl. .................................... 219/69.13; 219/69.14; 219/69.18
[58] Field of Search ............................. 219/69.13, 69.18, 219/69.19, 69.2, 69.14

[56] References Cited

U.S. PATENT DOCUMENTS

| | | | |
|---|---|---|---|
| 4,185,184 | 1/1980 | Pfau | 219/69.13 |
| 4,375,588 | 3/1983 | Frei | 219/69.13 |
| 4,800,248 | 1/1989 | Futamura et al. | 219/69.18 |
| 4,952,790 | 8/1990 | Futamura | 219/69.13 |
| 5,183,988 | 2/1993 | Takeuchi et al. | 219/69.13 |
| 5,637,240 | 6/1997 | Izumiya et al. | 219/69.17 |

*Primary Examiner*—Geoffrey S. Evans
*Attorney, Agent, or Firm*—Bruce A. Jagger

[57] ABSTRACT

A method of electrical discharge machining a workpiece, while maintaining the desired size, shape and surface finish of the cut. After an initial machining operation at an initial power setting forms a cut of the desired size and finish in the workpiece to some initial depth, a multi-phase machining cycle is established to carry the cut deeper. Machining is carried out for most of this multi-phase cycle at a reduced power setting, which results in the reduction of at least the rate of particulate debris production. If reduced on-time power settings are employed, the average particle size of the debris is also reduced. At the very end of the multi-phase machining cycle, the power setting is abruptly increased to a level which is sufficient to cause substantial agitation of the dielectric fluid in the spark gap. If the on-time power level has been reduced, the cut is enlarged to the desired size by the terminal power pulse. Hydraulic flushing by physically stroking the electrode in and out of the spark gap may also be employed, if desired.

17 Claims, 7 Drawing Sheets

EDM CONTROL BY ADJUSTING THE ON-TIME POWER LEVEL

BACKGROUND OF THE INVENTION

1. Field of the Invention

The invention relates in general to electrical discharge machining (EDM) and, in particular, to a method for controlling the precision forming of deep cuts such as, for example, blind holes, and other openings using EDM equipment.

2. Description of the Prior Art

EDM techniques had been used extensively for forming, among other things, precise cuts such as, for example, holes or openings, particularly blind holes, in extremely hard, electrically conductive materials, with the limitation that the maximum possible depth of such blind holes generally was believed to be less than approximately 0.060 inches. This limitation occurred because, as the machining surface of the bottom of the hole was machined by the cutting pulse spark of the EDM electrode, debris accumulated in the spark gap, induced arcing, and prevented further significant machining of the machining surface Various expedients, including hydraulic flushing of the spark gap, had been proposed. Vigorous hydraulic flushing can deflect small electrodes so as to impair the accuracy of the operation. The problem of machining small, deep, blind holes, while maintaining a desired size, shape and finish for the hole, had generally proven to be unsolvable.

The debris which is inevitably formed by EDM operations is generally composed largely of very small particles of the material which is machined from the workpiece, and carbon formed by thermal degradation of the cutting fluid. The debris can, and often does, build up in the spark gap, and may even bridge between the electrode and the workpiece so as to cause arcing. This causes at least the working gap voltage, and the characteristics of the radio frequency emitted by the machining process to change. It also prevents any further significant machining of the workpiece, because all or most of the energy is going into reworking debris. Unless it is removed the debris will eventually make further machining impossible. Previous expedients have employed adaptive controls in an attempt to overcome the problem of energy loss or arching in the debris. U.S. Pat. Nos. 4,357,516, 3,056,065, and 3,943,321 generally disclose the application of a succession of individually discrete pulse trains to the spark gap separated by a long off-time in response to an excessive accumulation of debris in the spark gap. U.S. Pat. No. 4,338,504 discloses monitoring radio frequency emissions of the cutting pulse spark, and in response to a change in radio frequency emissions, the cutting pulse spark is interrupted. The radio frequency emissions change is an indication of excessive accumulation of debris in the spark gap, particularly carbonaceous debris. Hydraulic flushing of the spark gap by the dielectric fluid was previously induced by physically moving or pulsing the electrode in and out of the spark gap as a way of dealing with debris accumulation. Such attempts to overcome the problem of arcing and energy loss in the debris had generally become completely ineffective in, for example, deep, small, blind holes at depths of somewhere between about 0.030 and 0.060 inches, and with large electrodes. The present invention is particularly applicable to accurately machining small, deep, blind holes where the ratio of the depth of the hole to the smallest lateral dimension of the hole is greater than approximately 1:1.

The limitation on the depth at which previous EDM processes could machine small blind holes severely restricted the utility of such EDM operations. It should be noted that all fully surrounded holes are blind holes while they are being formed, unless an opening has been previously made in the workpiece. Likewise, all through holes are blind holes while they are being formed, until they break through the workpiece. Thus, the previous inability to form small, deep, blind holes had limited the depth of all small diameter holes. Problems had also been encountered with large holes particularly where there is a considerable distance between the center and the edges of the electrode. The concentration of debris is apparently greater at the approximate center of a large electrode than around its edges. Physically, such debris has further to travel to escape from the spark gap than that which is generated near the edges of the electrode.

These and other difficulties of the prior art have been overcome according to the present invention. Those concerned with these problems recognize the need for an effective and reliable way to accurately machine small, deep, blind holes of nearly unlimited depth by the EDN process.

BRIEF SUMMARY OF THE INVENTION

According to the present invention, workpieces can be accurately and rapidly machined by controlling the rate of debris production, and, if necessary, the average particle size of the debris, so that the debris is removed from the spark gap as it is generated. The cutting spark is thus able to cut the work piece rather than reworking the debris. The rate of generation and average particle size of the debris is controlled according to the present invention by controlling both the average power level and the on-time power level supplied to the cutting spark. The average power level considers the entire cutting spark cycle, including the off-time. The on-time power level only considers those operating parameters which define the cutting spark during the on-time. Counterintuitively, it has been found that reducing the average power, and sometimes the on-time power, supplied to the cutting spark, when coupled with certain other operating conditions, dramatically increases the cutting rate and depth of penetration. In general, when operating at reduced power levels, a terminal power pulse is utilized to maintain an acceptable cutting rate.

The debris is generally removed from the spark gap through several mechanisms. The agitation of the dielectric fluid which is caused by the action of the cutting spark tends to carry debris away from the spark gap. The small correctional movements of the electrode within the spark gap caused by the operation of conventional EDN controls causes movement of the dielectric fluid which carries debris out of the spark gap. Conventional EDN procedures such as, for example, hydraulically flushing the spark gap by mechanically pulsing the electrode in and out of the spark gap may be employed in conjunction with the present invention.

The rate of debris production and particle size are generally proportional to the level of on-time power which is supplied to the cutting spark. The average particle size of the debris generally varies proportionally with the length of the on-time, the voltage and the amount of the current, that is, the parameters which define the cutting spark. The length of the off-time generally does not influence the particle size because it has no impact on the characteristics of the cutting spark. The length of the off-time does influence the average power level supplied to the cutting spark, and, thus, the rate of debris production.

Debris removal is accomplished by the hydraulic action of the dielectric fluid due to movement of the electrode, and the agitation of the fluid which is caused by the cutting spark. The cutting spark causes agitation by at least the formation of debris, vapor, thermal gradients, and the like. In general, the higher the level of power, on-time or average, the greater the agitation. Up to a point, increased power settings increase the rate of debris removal to more or less keep up with the increased rate of debris generation. As the cut becomes more constricted, however, the rate of production overwhelms the systems unaided ability to remove the debris, and efficiency drops substantially.

The size and finish of the cut are determined by the level of on-time power supplied to the cutting spark. In general, increasing the on-time power to the cutting spark will increase the size of the cut, and will provide a coarser finish. When the on-time power level is reduced, the cut becomes smaller and the finish becomes finer. Reducing the on-time power level to the cutting spark so as to reduce the rate of debris production and the average particle size of the debris inevitably reduces the size of the cut. A generally unacceptable result for at least two reasons. The cut is the wrong size, and the cut is constricted so that it is even more difficult to remove debris.

It has been found that the size of the cut, and the desired size and finish of the cut can be maintained even at reduced on-time power levels. This is accomplished by periodically, for a very brief period of time, elevating the on-time power level to that which is required to enlarge the cut so as to enhance debris removal, and to produce the desired cut size and finish. This terminal power pulse may or may not be accompanied by enhanced hydraulic action induced by withdrawing and reinserting the electrode in the spark gap. The cutting spark produced by the increased power level in the terminal power pulse does cause increased agitation in the spark gap. The increased agitation tends to increase the debris removal rate.

As cuts such as, for example, blind holes become deeper the flushing of the debris from the spark gap becomes less efficient. In order to maintain a high rate of penetration according to the present invention, the average power levels are reduced by, for example, increasing the length of the off-time. This reduction in the average power level will generally not be effective unless a terminal power pulse is provided to cause enhanced debris removal due to increased agitation of the dielectric fluid. Enhanced hydraulic action by pulsing the electrode into and out of the spark gap may also be provided, if desired. A high machining rate is thus achieved by the counterintuitive action of reducing the power level.

At some even greater depth the rate of debris production and the nature of the debris will be such that its efficient removal will require a reduction in the average particle size as well as further reductions in the rate of debris production. Particle size reduction is accomplished by reducing the on-time power to the cutting spark, for example, by reducing one or more of the working gap voltage, the peak current, or the on-time. Such further reductions in power to the cutting spark counterintuitively provide excellent machining rates provided the necessary instantaneous terminal power pulse is provided as needed to maintain the desired hole size and finish and to agitate the dielectric fluid in the spark gap. The power pulse, for reasons which are not completely understood, among other things, serves to sweep the spark gap free of debris.

There are certain detectable indicators which reveal whether the cutting spark is eroding the machining surface or primarily just reworking debris in the spark gap. These indicators of the conditions in the spark gap include, for example, changes in the radio frequency which is generated in the spark gap, changes in the gap voltage, and erratic quill movement. The radio frequency generally changes when the cutting spark encounters carbonaceous debris in the spark gap. The carbonaceous debris apparently acts as a semiconductor parallel to the path through the dielectric fluid. As is known to those skilled in the art, this change in the radio frequency can be detected, for example, by amplifying the signal and putting it through a speaker so that it becomes detectable by the operator through the sense of hearing.

Excessive debris in the spark gap causes the automatically controlled quill which carries the electrode to behave erratically. According to conventional procedures, a dial indicator associated with the quill permits close observation of the quill's movements. The quill will make steady progress towards the workpiece while the cutting spark is not primarily reworking debris. In general, the gap voltage is continuously monitored and the position of the electrode which is carried by the quill is automatically adjusted within the spark gap responsive to changes in at least the gap voltage. A build up of debris in the spark gap generally causes the gap voltage to drop. When the gap voltage drops the servo is activated so as to withdraw the electrode for a distance sufficient to restore the preset gap voltage. When excess debris builds up in the spark gap the automatic controls will, among other things, back the quill out but not promptly return it, or will back it out so far that when the debris does clear the cutting spark is extinguished because the electrode has withdraw completely out of the spark gap. The net result of the presence of excess debris causes the quill to appear to chatter, and the rate of progress towards the workpiece slows or stops. The gap voltage can be monitored separate and apart from the quill movement, if desired.

Monitoring the detectable indicators of conditions within the spark gap provides an operator with information upon which to make decisions as to the establishment and adjustment of the various parameters which control the operation of the EDM machining operation. In general, the adjustable parameters which are subject to operator control include at least those which determine the on-time power and the average cycle power to the cutting spark, including, gap voltage, peak current, on-time and off-time, the amplitude and frequency of any hydraulic flushing generated by mechanically stroking the electrode in and out of the spark gap, and, in a multi-phase cycle, the period or length of each of the respective phases.

The desired size and finish of the cut dictate the maximum on-time power which can be applied to the cutting spark. In general, the other parameters are adjusted so as to achieve the maximum machining rate for the power which is applied to the cutting spark.

In a multi-phase machining cycle where a terminal power pulse is utilized, the other parameters are generally adjusted by a process of iteration with the objective of maximizing the average cycle power consistent with good debris clearing. The operator adjusts the respective lengths of the machining phases while monitoring conditions in the spark gap until the conditions become favorable for continued machining. In general, the length of the terminal power pulse phase is minimized so as to avoid debris build up and maximize the benefit of the turbulence generated by the sudden power surge. Approximately the shortest possible period for the terminal power pulse is generally used as the starting value. The length of the reduced power phase is initially established at some multiple of the length of the terminal power pulse. The respective lengths of the phases are adjusted until conditions in the spark gap become favorable for continued machining.

Conditions are generally deemed to be favorable for continued machining when they indicate that the debris is not interfering with the machining of the workpiece, so that machining is proceeding at a rate which is acceptable in view of the amount of power per cycle which is being applied to the cutting spark. In general it has been found that conditions in the spark gap become favorable for continued machining when the length of the reduced power machining phase is at least approximately 10 times, and preferably at least approximately 30 times or more the length of the terminal power pulse phase, with differences of 500 times or more being possible. Hydraulic flushing interrupts the cutting spark for some period of time, and long electrode strokes increase the flushing time, so the amplitude and frequency of hydraulic flushing are preferably minimized. The spark gap conditions are monitored as adjustments are made in the respective lengths of the phases, the average cycle power, and, when used, in the hydraulic flushing. As soon as the respective lengths of the phases have been established, and the average cycle power has been reduced to where good debris removal is achieved, with or without hydraulic flushing, the parameters are held until debris build up again interferes with the machining operation. The various parameters are established through an iterative process because it is generally not possible to determine in advance of operating the process what the optimum parameters will be. Also, because the various parameters are, to a certain extent, interdependent, approximately the same results can be achieved with very different parameter settings, provided the teachings of the present invention are followed.

In general, cutting or machining is initiated in the first instance by establishing a cutting spark pulse in a spark gap between an axially moveable electrode and the surface of a workpiece. According to conventional procedures, the electrode and the workpiece are both immersed within a body of dielectric liquid so that the spark gap between them is filled with fluid. As is understood by those skilled in the art the nature of the cutting fluid, and particularly its conductivity, has a significant effect on the EDM operation. The initial spark cycle average power level is established at such a level that a cut of the desired size and finish will be produced. The shape of the cut is approximately determined by the shape of the electrode. According to conventional procedures, conditions in the spark gap are continually monitored and minute adjustments to the width of the spark gap are continuously made by adjusting the position of the electrode relative to the workpiece. These minute adjustments do not withdraw the electrode from the spark gap.

As machining progresses, the surface where machining occurs forms the bottom of the cut, because the end of the electrode is continuously maintained in a position which is closer to the bottom surface of the cut than it is to the walls or sides of the cut. If the electrode is closer to the sides than the bottom of the cut, the machining will take place on the sides of the cut. In general, the greater the spark cycle average power level, the greater the distance between the electrode and the surrounding walls of the cut.

As machining proceeds, debris is formed. The dielectric fluid carries the debris out of the spark gap. As the cut becomes deeper, it becomes more difficult for the dielectric fluid to carry the debris away from the spark gap. As debris accumulates in the spark gap, the machining rate decreases because the energy is going into reworking the debris instead of cutting on the machining surface at the bottom of the cut. At some cut depth the spark gap will become so clogged with debris that the machining rate will fall below acceptable levels, or even fall to almost zero.

According to the present invention, when the initial power settings and operating conditions no longer provide the desired effect, that is, one or more of the monitored conditions within the spark gap becomes unfavorable, a multi-phase machining cycle is established. During this multi-phase machining cycle, machining is initiated and carried out at a reduced power during a reduced power phase. This power level is conveniently reduced, as compared to that in the initial machining operation, for example, by increasing the off-time, or the like. Since the length of the off-time has no significant effect on the characteristics of the cutting spark, the size and finish of the cut remain about the same, as does the average particle size of the debris. The rate of debris production is, however, reduced by as much as one quarter to one half or even more. The rate of debris production is determined indirectly, that is, it is estimated from the changes in conditions within the spark gap, and from the average power cycle levels which are applied to the cutting spark. When conditions within the spark gap are favorable, it is assumed that most of the power is going into machining the surface of the workpiece and creating fresh particulate debris, rather than reworking previously formed debris. The quantity of debris generated per unit of time decreases, because the average power level over the cycle has been reduced. Adjusting the off-time will generally bring the rate of debris generation down to a level where the available hydraulic action and fluid agitation are sufficient to remove the debris from the spark gap rapidly enough to permit machining of the workpiece to continue. This multi-phase machining cycle is terminated by instantaneously elevating at least the average power level and holding it there for a very brief period of time. The elevated power level can, for example, be the same as that used in the initial machining phase. For reasons which are not fully understood this appears to contribute significantly to clearing the debris from the spark gap. The application of this terminal power pulse for such a very brief period of time apparently produces a substantial effect which is not nullified by the increased rate of debris generation. A new cycle is started by returning the power level to a reduced level. This power pulse may, if desired, be accompanied by physically withdrawing the electrode from the spark gap in the first stage of a physical flushing phase. The physical flushing phase, when used, is concluded by returning the electrode back into the spark gap where the cutting spark can be established again.

Where the system is operated at reduced on-time power levels, the size and finish of the cut are apparently generally determined by the nature of the terminal power pulse. The cut size and finish are generally found to correspond to those which would be produced if the system were operated continuously at the terminal power pulse settings. Even though applied in only instantaneous bursts, it is apparently sufficient to establish the desired size and finish for the cut.

Preferably, the abrupt transition from the reduced power machining phase to the terminal power pulse phase is substantially instantaneous. A plot of time versus power level, for example, shows substantially no elapsed time for the transition. That is, the curve during the transition is preferably substantially parallel to the power level axis. Although difficult to control, it may be possible to adjust the length and power level of the terminal power pulse to provide the desired size and finish without returning to the initial power level, or at least without abruptly returning to the initial power level. Because of control problems, this is not preferred.

As is known to those skilled in the art, cuts produced by EDH methods, particularly deep holes, tend to be slightly conical with the big end toward the top. This results from the fact that as machining proceeds, the debris passes out of the spark gap and up through the space between the electrode and the walls of the hole before escaping out into the body of dielectric fluid. While passing through this space, the conductive particles occasionally cause a cutting spark to form between the side of the electrode and the wall of the hole. This erodes the wall. The upper wall of the hole is exposed to this erosion for a longer period of time than the lower wall, and, therefore, suffers more erosion. According to conventional procedures, roughing electrodes are generally used to form holes, and finishing electrodes are used to straighten the holes and bring them within the desired tolerances. The present invention is applicable to both roughing and finishing operations, particularly where blind holes are involved. The reduced machining times achieved according to the present invention in some operations tend to reduce the amount of taper in the hole because the hole is exposed to cutting conditions for shorter periods of time.

In general, where physical flushing of the spark gap is desired, physical withdrawal of the electrode from the spark gap is initiated at approximately the same time the terminal power pulse is abruptly applied. The effect of debris accumulation from the increased power levels is thus minimized. Because of the inertia of the physical mechanism, the physical withdrawal of the electrode from the spark gap lags the change in the power level by some very small but finite period of time. The length of the terminal power pulse, according to one embodiment, is thus determined by the inertia in the physical mechanism which moves the electrode.

The mechanical response of the electrode withdrawal substantially lags the electrical signal that increases the spark cycle average power level to the level employed in the terminal power pulse. The terminal power pulse starts machining the workpiece before the electrode is withdrawn from the spark gap, and probably even before it starts to withdraw. As the electrode is withdrawn from the spark gap, the cutting pulse spark is eventually extinguished in the spark gap as the width of the spark gap becomes too large to maintain the cutting spark, marking the end of the terminal power pulse phase. If desired, the period or length of the terminal power pulse phase can be adjusted independently of the lag imposed by the physical inertia which is inherent in the mechanical components of the system. The period of the terminal power pulse phase, if desired, can be longer or shorter than that which would be dictated by the physical inertia of the system. The period of the terminal power pulse phase is adjusted, as may be necessary, to achieve the desired size and finish for the hole.

Where power at the terminal power pulse level is supplied to the electrode for the full length of its withdrawal stroke, some machining of the upper walls of the hole may occur by reason of the presence of conductive debris between the walls of the hole and the sides of the electrode, but the cutting spark at the bottom of the hole is extinguished as soon as the electrode withdraws far enough so that the dielectric fluid insulates that area from further erosion. Although it may appear that the cutting spark is still in existence by reason of the erosion of the upper walls, the physical location of the end of the electrode will show that the cutting spark has been extinguished at and near the bottom of the hole.

If desired, power to the electrode may be cut off during the withdrawal stroke when, for example, the electrode has withdrawn a certain predetermined distance, or when withdrawal has been underway for a certain period of time. This cut off of power before the electrode has traveled through its full withdrawal stroke reduces somewhat the undesired erosion of the upper walls of the hole.

While not wishing to be bound by any theory, it is believed that during the terminal power pulse phase the machining of the walls to the desired cut size and surface finish is accomplished. It is believed that the terminal power pulse at the end of the cycle contributes significantly to the machining of the bottom of the cut, as well as to the clearing of debris.

When hydraulic flushing is employed, the relatively large physical movement of the electrode as it is withdrawn from the spark gap causes the dielectric fluid within which it is immersed to rush in and fill the resulting void in the spark gap. When a new machining cycle is initiated by introducing the electrode back into the spark gap, the fluid is displaced from the spark gap. The resulting pumping action flushes the debris out of the spark gap so that a clean machining surface is presented as the next cycle begins.

The length of the stroke of the electrode, and the frequency with which the flushing phase is repeated, are adjusted so as to achieve the desired hydraulic flushing action. In general, it has been found that the length of the stroke is preferably several times the width of the spark gap. The length of the electrode stroke, however, generally does not depend on the size of the spark gap. The width of the spark gap is simply a convenient measure against which to compare the stroke length. The length of the electrode stroke is generally at least twice, and, preferably, at least 5 times or more, the width of the spark gap. Thus, for a typical spark gap of about 0.001 inches, the electrode stroke should preferably be at least 0.005 inches, and should typically be as much as 0.010 inches. Electrode strokes of less than 0.002 inches for a spark gap of 0.001 inches generally do not provide the desired flushing, and machining rates fall below the optimum values. Generally, the electrode stroke is 0.10 to 0.20 inches or more in deep cuts. The length of the electrode stroke does depends in part on the size of the electrode. The length of the electrode stroke also depends in part on the depth of the cut. For large electrodes substantially hydraulic flushing is required even at very shallow depths in order to clear debris from the central region of the spark gap. An electrode which is, for example, 2 inches square will require substantially more flushing than one which is 0.1 inches square, and that flushing will need to be initiated almost as soon as the cut is started. This greater flushing action generally requires at least a longer electrode stroke, and may require more frequent flushing.

In general, the electrode is preferably mounted on an axially moveable quill or ram so that it moves and the workpiece is fixed. All that is required for hydraulic flushing, however, is relative movement between the electrode and the workpiece, so that either the electrode, or the workpiece, or both, may be moved. In general, the flushing phase is repeated as frequently as may be required for efficient operation. For cuts where the debris accumulation does not impair the efficiency of the operation, the flushing phase may require one percent or less of the total time of the multi-phase machining cycles. Where debris accumulation reduces efficiency, the frequency of the flushing phase is increased to overcome the problem. In extreme situations the flushing phase may require as much as one half or more of the total cycle time. When the terminal power pulse phase is generally concurrent with at least a part of the flushing phase, the relationship between the length of the reduced power phase and that of the terminal power pulse phase changes with the change in the frequency of the flushing phase. The servo drives the electrode axially both to maintain the desired conditions within the spark gap, and to withdraw and reinsert the electrode during the hydraulic flushing phase of operation. The operation of the servo is generally coordinated by the computer controlled pulse generator. Preferably, both the frequency and amplitude of the electrode's movement during the hydraulic flushing phase are independently controllable by the operator. Hydraulic flushing can be initiated at any time by the operator, independent of the power level settings.

Depending upon the parameters present in a particular machining operation, the spark cycle average power level may need to be reduced only once from the initial settings. That reduction is preferably applied only to the average power level and not to the on-time power level. Optimum machining rates are thus achieved. In other circumstances a second or even further reductions may be required. Further reductions, where required, generally entail reduction of the on-time power level so that both the rate and average particle size of the debris are reduced. In general, it has been found that for most operations there is a minimum power level setting at which machining will proceed without the necessity of further reduction. That minimum power level depends, among other things, upon at least the configuration and size of the electrode, the nature of the dielectric, the material of the electrode, the material of the workpiece, and the size and finish for the cut. The size of a cut can be increased, for example, by increasing the power level without increasing the size of the electrode.

The spark cycle average power level can be reduced gradually in small increments or abruptly in relatively large increments, as desired. The various elements which determine the spark cycle average power level can be adjusted independently, depending upon the nature of the controls which are provided. Gradual adjustment, based upon and responsive to instantaneous detailed information as to the conditions in the spark gap, generally requires the use of relatively expensive and complicated computer control systems. It has been found that, in general, the provision of a system which permits two relatively large manual adjustments to the power level setting serves well for most purposes. The necessity for providing, operating and maintaining more elaborate and complicated controls is thus avoided.

A preferred embodiment of the EDM control according to the present invention comprises a method of operating an EDM system under conditions whereby deep cuts of almost unlimited depth are easily and reliably formed. Such cuts with depth to smallest lateral dimension ratios (aspect ratios) of 20:1, or more, are readily produced.

The cutting pulse spark is generally generated by a computer controlled pulse generator which permits an operator to specify at least some, and preferably, all of the parameters which define the initial spark cycle average power level of the cutting pulse spark. In general, the initial spark cycle average power level is set by specifying the peak current of the cutting pulse spark, the working gap voltage of the cutting pulse spark, the on-time of the cutting pulse spark, and the off-time of the cycle. The computer controlled pulse generator should allow the operator to at least adjust the peak current, the working gap voltage, and the on-time and off-time, of the cutting pulse spark. The computer controlled pulse generator controls the system responsive to signals received from the spark gap so as to maintain the operator specified conditions in the spark gap during the machining of the workpiece. In general, that control at least takes the form of axial adjustments in the position of the electrode relative to the workpiece.

The spark gap is the distance between the workpiece and the electrode when the cutting pulse spark is applied by the computer controlled pulse generator. The cutting pulse spark has a repeating spark duty cycle of on-time and off-time. The width of the spark gap is adjusted by continuously monitoring at least the working gap voltage in the spark gap, and making minute adjustments in the position of the electrode, so as to maintain the working gap voltage within a predefined range. These minute adjustments of the spark gap are generally less than 0.001 inch in stroke length. These minute adjustments are insufficient in length to withdraw the electrode from the spark gap. Thus, the adjustments in the position of the electrode within the spark gap to maintain the efficient operation of the cutting spark are to be distinguished from the stroke of the electrode during the flushing cycle which withdraws the electrode from the spark gap and extinguishes the cutting spark. As the electrode is minutely withdrawn from the workpiece, the spark gap increases and the working gap voltage increases, and as it approaches the workpiece, the spark gap decreases and the working gap voltage decreases. If the electrode approaches so close to the workpiece that a dead short occurs, the working gap voltage drops to about zero. Radio frequencies generated in the spark gap are also often monitored, and the results of the monitoring can be used for controlling conditions in the spark gap, if desired.

According to one preferred embodiment the operator is provided with various information upon which to base decisions as to the manual adjustment of the various operating parameters Radio frequency can be monitored by amplifying the R.F. signal generated in the spark gap and running it through a speaker. When the radio frequency changes, the operator knows that debris, and particularly, carbonaceous debris, is building up in the spark gap. The action of the quill in response to the automatic system controls provides visual clues as to conditions within the spark gap. If the quill is carrying the electrode into the workpiece at a steady rate, the debris is being cleared from the spark gap at an adequate rate. If the quill appears to chatter with little forward progress the debris is not being cleared from the cut. The operator should make the minimum reduction in power level which is required to reestablish the desired radio frequency, and permit the quill to resume a steady advance towards the workpiece. Excessively conservative reductions in power level will only slow the operation down without affording any significant benefits. Thus, increasing the off-time, without more, is generally the first stage. Hydraulic flushing by mechanically pulsing the electrode in and out of the spark gap is generally not initiated until required. Reductions of the on-time power levels are preferably not initiated until no other alternatives remain available.

Continued operation of the original machining operation results in forming a cut in the workpiece. Eventually a depth is reached at which a first predetermined condition occurs. In general, the first predetermined condition occurs when the radio frequency changes, and the quill ceases to make good progress towards the workpiece, indicating that the rate of machining has decreased to an unacceptable level. In general, when the first predetermined condition occurs, so much debris is accumulating so rapidly in the spark gap that the cutting pulse spark is primarily reworking debris instead of machining the workpiece. In order to continue machining the workpiece at an acceptable rate, the initial machining operation is discontinued and a multi-phase machining cycle is initiated. The spark cycle average power level is reduced. If the operator is informed by a change in the radio frequency, and the behavior of the quill, that debris clearing is adequate, no further adjustments are made until the signals again indicate excessive debris build up in the spark gap.

In a preferred embodiment of the present invention, the system parameters are manually controlled by the operator who adjusts the computer controlled pulse generator in response to some observed conditions. However, the system parameters can also be controlled by utilizing a conventionally programmed microprocessor or timer circuit in operative association with the computer controlled pulse generator to control the rate of production and average particle size of the debris.

As will be understood by those skilled in the art, references herein, including the claims, to entering a machining phase, adjusting the cutting pulse spark, the spark cycle average power level, the on-time power level, or the like, unless otherwise indicated, includes smooth gradual, small incremental, and large single step adjustments. For fully automated systems, adjustments in the power level may preferably be made by gradual or small incremental instantaneous adjustments over some period of time in response to small changes in conditions within the spark gap. The description and claiming of the use of hydraulic flushing at reduced power levels, as will be understood by those skilled in the art, does not preclude the use of hydraulic flushing at higher power levels.

In general the change in the average particle size of the debris can be observed by noting the difference in the settling rate of the debris in the dielectric fluid, or by noting what filter size is required to remove all of the debris from the dielectric fluids. Also, the rate of particle debris generation in the multi-phase machining cycle is generally significantly less than that in the initial machining operation, so the rate of debris accumulation in the filter is also an indication of the level of the power setting. In general, during the machining of very deep cuts, the on-time power levels will be reduced to such low levels that the debris will form a cloud in the dielectric fluid, which cloud will appear to float for at least a minute without any settling being apparent to the naked eye.

In a preferred embodiment of the present invention, the computer controlled pulse generator is hardwired to provide two manually selectable settings for the operation of the multi-phase machining cycle. Both settings provide all of the phases for the cycle. One setting provides a power level which is generally satisfactory for substantially deepening the cut from that formed by the original operating conditions. The second setting further reduces the power level so that extremely deep cuts may be formed. As the cut depth increases, the operator manually switches to the first setting and the computer controlled pulse generator operates the system in the first machining cycle. As the cut depth increase even further, the operator can select a setting wherein the computer controlled pulse generator continues to operated in the multi-phase machining cycle, but at as lower power setting.

If desired, conventional microprocessor controls may be utilized to provide the capability of infinitely varying the parameters of the spark cycle average power level, either by operator selection, or software or firmware selection, based, for example, on the results obtained from monitoring conditions within the spark gap. Such monitored conditions include, for example, working gap voltage, cutting rate, radio frequency emissions, peak current, and the like. All of the parameters which influence the spark cycle average power level which is delivered to the spark gap, including, for example, the on-time, the off-time, the working gap voltage and the peak current, may be continuously optimized and adjusted, concurrently or independently, when fully automated microprocessor control is employed. The frequency, length and rate of the electrode stroke in the hydraulic flushing phase may also be similarly controlled, if desired.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of machining conductive materials by the electrical discharge machining process. While the description which follows hereinafter is meant to be representative of a number of such applications, it is not exhaustive. As those skilled in the art will recognize, the basic method taught herein can be readily adapted to many uses. It is applicant's intent that this specification and the claims appended hereto be accorded a breadth in keeping with the true scope and spirit of the invention being disclosed despite what might appear to be limiting language imposed by the requirements of referring to the specific examples disclosed.

Referring particularly to the drawings for the purposes of illustration only and not limitation.

DETAILED DESCRIPTION OF THE PREFERRED EMBODIMENTS

The terms referred to herein and in the claims are to be understood to mean the following, "cutting pulse spark", a continuous series of electrical pulses between an electrode and a machining surface of a workpiece; "spark cycle", the time for one complete pulse which is the sum of one on-time and one off-time of the cutting pulse spark; "spark cycle average power level", the average power level across the spark gap during one spark cycle; "spark duty cycled", the percentage of the sum of the on-times for a given time period divided by the sum of the on-times and off-times of the same time period; "working gap voltage", the voltage measured across the spark gap while the cutting pulse spark is engaged.

Figure 1:
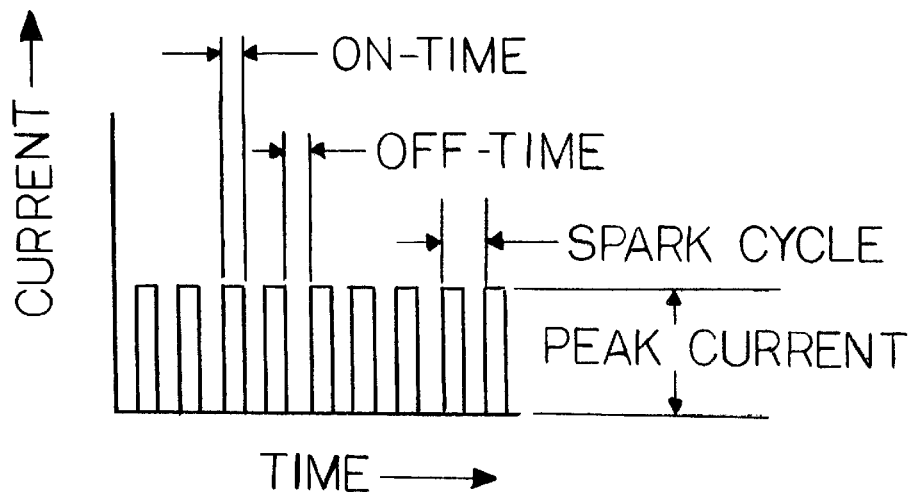
FIG. 1 is a schematic illustration, not to scale, of a typical cutting pulse spark as a repeating square wave of electrical pulses generated by a solid state EDM pulse generator power supply.

Typical EDM operations utilize square wave pulses. FIG. 1 illustrates a cutting pulse spark as a repeating square wave of electrical pulses generated by a transistorized or solid state EDM pulse generator power supply. The spark cycle is shown as the sum of one on-time and one off-time of the cutting pulse spark measured in micro seconds (s). The relative lengths of the on-time and off-time are not to scale. The inverse of the spark cycle is the frequency of the spark cycle measured in Hertz (Hz). Associated with each pulse is peak current measured in Amperes (A), and the working gap voltage measured in Volts (V). The spark cycle average power level, measured in Watts (W), is the working gap voltage (V) times the peak current (A) times the spark duty cycle (%). A typical EDM system operates with a cutting pulse spark having an on-time approximately between 3 microseconds to 1 millisecond, at frequencies from less than about 1 KHz to more than about 250 KHz, peak currents from less than about 0.005 A to approximately 200 to 500 A or even more, and working gap voltages from less than approximately 40 V to more than approximately 300 V. Conventional operating conditions are selected depending on the results desired, the most common being the machining finish, the cut size, and the desired machining efficiency. For example, machining efficiency varies with the on-time and off-time settings, and machining efficiency is increased when the spark duty cycle is increased. Also, an increase in peak current increases machining efficiency. However, increased machining efficiency results in a rougher machining finish. Thus, selection of the initial set of operating conditions vary for different machining operations.

Referring now to FIGS. 2 through 9, there is schematically illustrated a method of operating an EDN system according to the present invention. Like reference numerals designate identical or corresponding parts in successive FIGS. Electrode 10 is attached to pulse generator 12 which is in electrical contact with workpiece 14, thus establishing an EDM electrical circuit. The workpiece can have either negative or positive polarity. Electrode 10 and workpiece 14 are submerged in dielectric fluid 16. Any conventional dielectric fluid, including, for example, kerosene, natural and synthetic oils, deionized water, synthetic cutting fluids, and the like, can be used, however, a dielectric fluid with a relatively low conductivity is generally preferred. Electrode 10 is mounted for reciprocal movement relative to workpiece 14. No provision is made for providing a pressurized jet of dielectric fluid in the hole in the workpiece. Such jets tend to cause erratic deflection of thin electrodes which impairs the accuracy of the process. Debris removal from the hole is thus dependent upon the hydraulic action caused by the movement of the electrode, and turbulence generated by the cutting spark.

Figure 2:
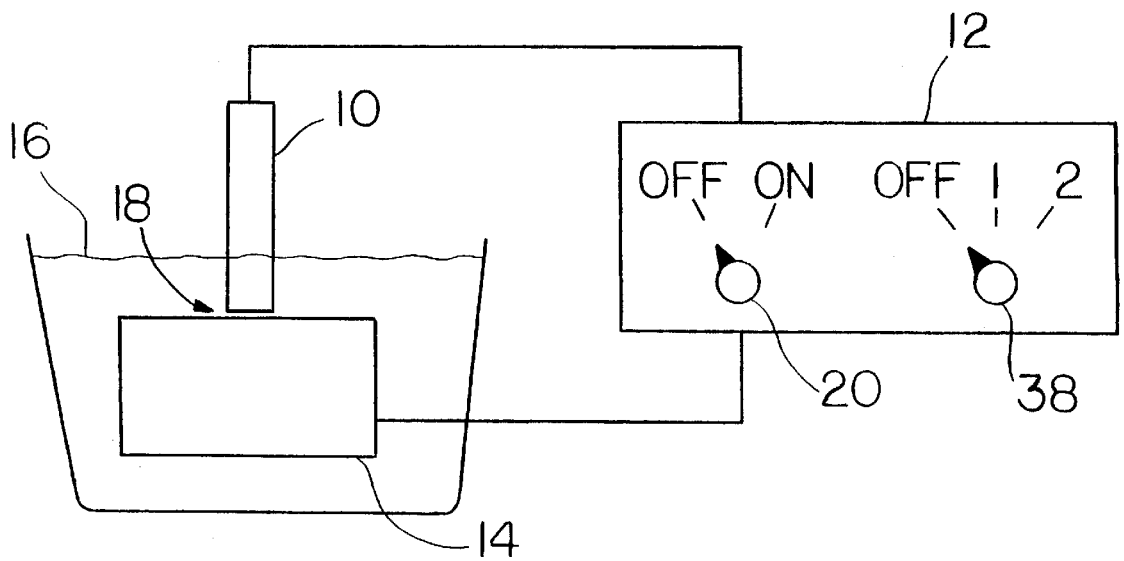
FIG. 2 is a schematic view of an EDM system according to the present invention just prior to initiating a cutting pulse spark to start a machining operation.

Referring particularly to FIG. 2, electrode 10 is spaced from workpiece 14 by distance 18 and there is no cutting pulse spark as the pulse generator switch 20 is in the "off" position. Prior to switching pulse generator switch 20 to the "on" position, the operator preselects an initial set of operating conditions for the pulse generator. Such operating conditions define the initial power level, and are conventionally selected to obtain the desired finish and size of cut for a given electrode, dielectric fluid and workpiece.

Figure 3:
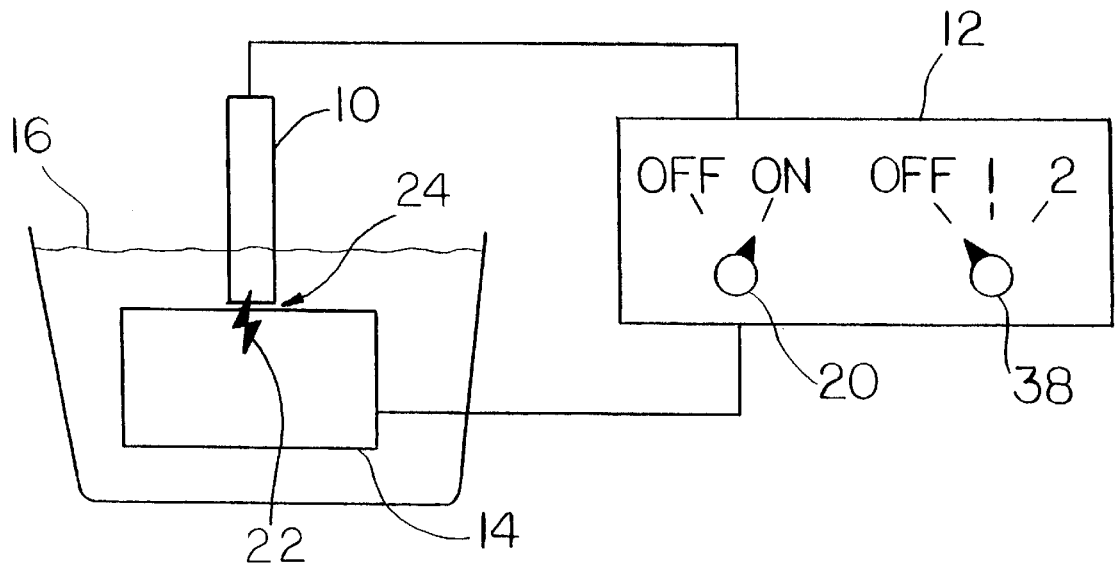
FIG. 3 is a schematic view similar to FIG. 2 illustrating the start of an original machining operation at a high spark cycle average power level.

Referring particularly to FIG. 3, pulse generator switch 20 has been switched by the operator to the "on" position, which activates the initial or original set of operating conditions. The initial set of operating conditions initiates the cutting pulse spark across spark gap 24 at an initial spark cycle average power level 22, illustrated schematically as a large electrical bolt. Debris is generated at an initial rate and at an initial average particle size. The minute automatic adjustments of the electrode within the spark gap, responsive to the monitored conditions in the spark gap, and the turbulence generated by the cutting spark cause the debris to be removed from the spark gap.

Figure 4:
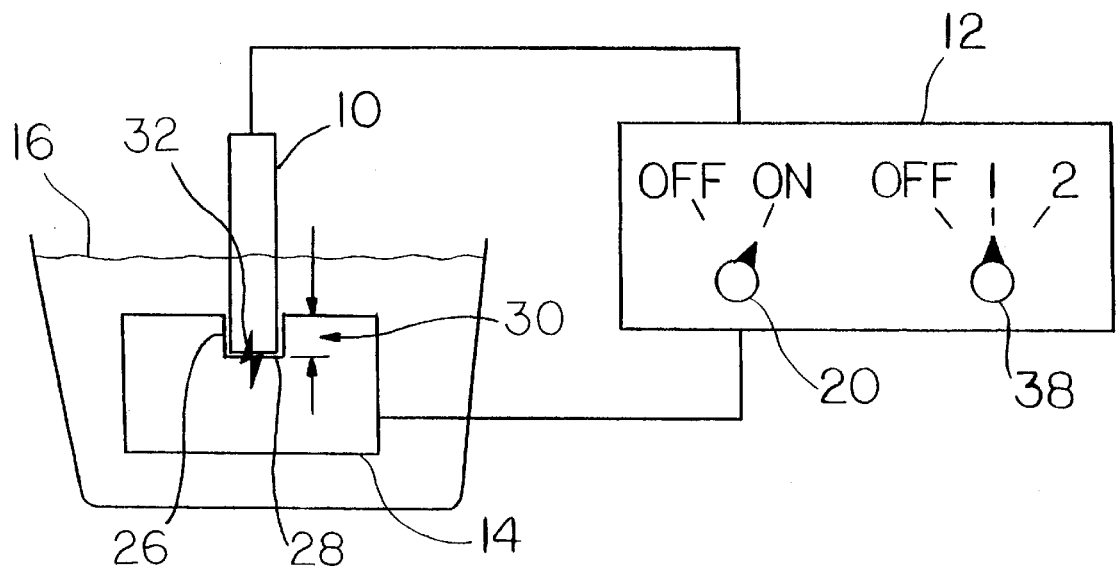
FIG. 4 is a schematic view illustrating machining during the reduced power phase of a multi-phase machining cycle.

Between the stages illustrated in FIG. 3 and FIG. 4, respectively, the initial spark cycle average power level 22 of the cutting pulse spark has machined the start of blind hole 26, which is illustrated in FIG. 4 as having machining surface 28 and depth 30. When depth 30 of blind hole 26 approaches somewhere between approximately 0.030 and 0.060 inches, a first predetermined condition will occur wherein the cutting spark is primarily reworking debris instead of machining the machining surface 28, as evidenced by a change in the radio frequency generated in the spark gap and a hesitation in the rate of progress of the quill towards the workpiece. All of which indicates that the efficiency and the machining rate are about to, or have already fallen off to commercially unacceptable levels considering the average power level which is being applied to the cutting spark.

Generally, the first predetermined condition is also indicated by a drop in the working gap voltage. A servo minutely moves the electrode in the spark gap to maintain the working gap voltage within pre-set values. The first predetermined condition is detected, for example, when the electrode is minutely pulled out, approximately between 0.001 to 0.002 inches from the original spark gap to maintain the working gap voltage at the pre-set value, but the working gap voltage drops again and the servo minutely withdraws the electrode further. This occurs because the working gap voltage, initially established between electrode 10 and machining surface 28, becomes established between electrode 10 and the conductive particles of the debris just above machining surface 28. Because the distance between electrode 10 and the particle debris is less than the distance between electrode 10 and machining surface 28, the monitored working gap voltage decreases and the servo automatically withdraws the electrode further in response to the decrease.

According to the present invention, in response to the occurrence of the first predetermined condition, switch 38 is switched by the operator to position "1" which overrides the initial operating conditions and establishes a first set of operating conditions for a multi-phase machining cycle. The first phase of this cycle is illustrated schematically in FIG. 4. The multi-phase machining cycle includes a first machining or reduced power phase, a machining termination phase, and a reestablishing phase. The machining termination phase includes at least a terminal power pulse phase, and, if desired, may also include the initiation of a hydraulic flushing phase. When utilized, the hydraulic flushing phase is completed during the reestablishing phase.

In FIG. 4, the power of the cutting pulse spark is adjusted downwardly to a first spark cycle average power level 32, illustrated with a smaller electrical bolt, as compared to that of original spark cycle average power level 22. Preferably, the on-time power to the cutting spark remains the same, and the off-time is increased to reduce the average power in the cycle. The rate of debris production is thus reduced without reducing the average particle size of the debris, or changing the size of the cut. First spark cycle average power level 32 of the cutting pulse spark generates particulate debris of a first size and at a first rate. With this reduction in power the debris is again efficiently cleared from the spark gap. As machining continues to greater depths, however, the debris removal becomes less efficient and debris again builds up in the spark gap. The indications of the debris build up are the same as for the first predetermined condition, and include, for example, a change in the radio frequency, a change in gap voltage, a hesitation in the progress of the quill or even a chattering of the quill, and the like. These indications can be received, interpreted and acted upon by an operator or by a microprocessor and associated software.

Figure 5:
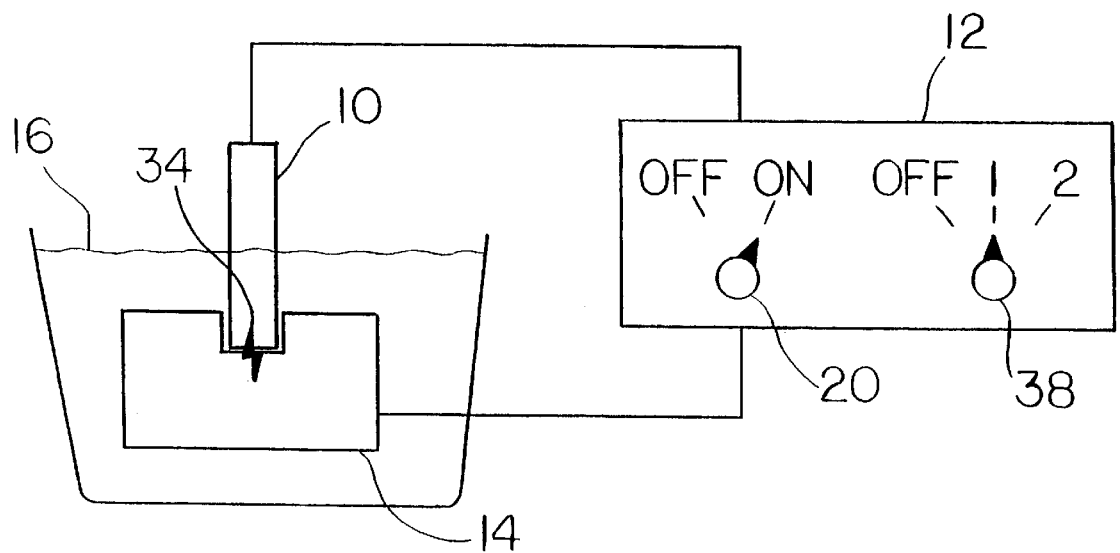
FIG. 5 is a schematic view illustrating machining during the terminal power pulse phase of a multi-phase machining cycle.

Generally, in order to prevent excess debris accumulation, the second machining phase of the first machining cycle is initiated as depicted in FIG. 5. This second machining phase generally employs elevated power settings so that greater agitation of the dielectric fluid in the spark gap is caused by the action of the cutting spark. According to an embodiment of the present invention, an operator adjustable timer circuit, or other control, monitors the amount of time the first machining cycle operates in the first machining phase, and when the first machining phase has operated for the period prescribed by the operator, the timer circuit initiates the second machining phase. The second machining phase is in the form of an instantaneous terminal power pulse. The first machining phase is reestablished after the instantaneous terminal power pulse. Hydraulic flushing may, or may not, be employed between the end of the terminal power pulse and the reestablishment of the first machining phase.

Figure 6:
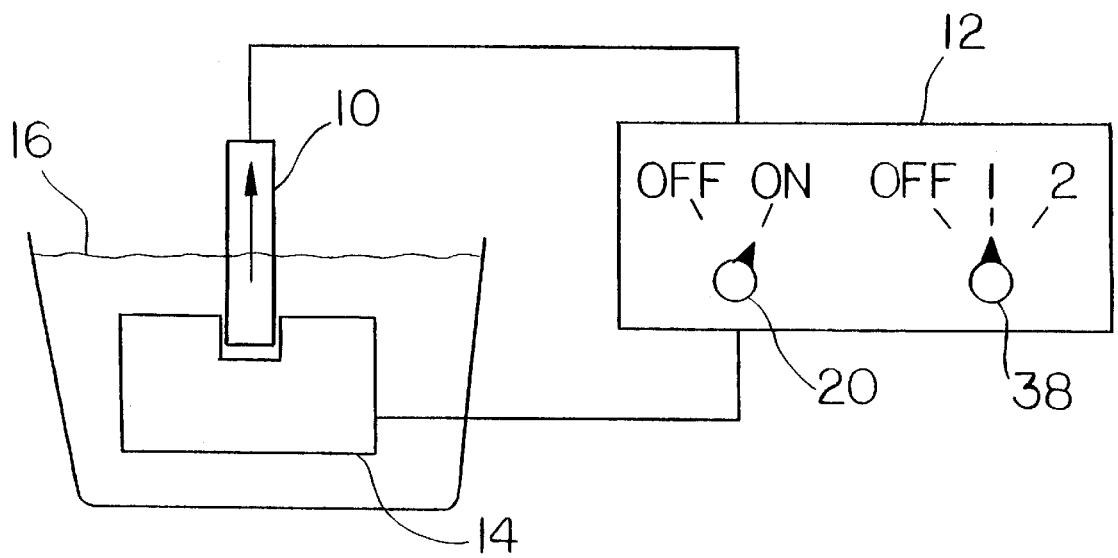
FIG. 6 is a schematic view illustrating the electrode withdrawal from the spark gap after the extinguishment of the cutting spark pulse during the hydraulic flushing phase.

In the second machining phase, as depicted in FIG. 5, the spark cycle average power level is raised to a second spark cycle average power level 34, illustrated by a larger electrical bolt, that is approximately equal to the initial spark cycle average power level 22 in the initial machining phase, FIG. 3. According to one embodiment where an hydraulic flushing phase is employed, substantially simultaneously with the initiation of the second machining phase, the machining termination phase is initiated by a signal sent to servo controlled electrode 10 (servo not shown) to withdraw the electrode from the spark gap. Due to the mechanical lag in the servo reaction time, the second machining phase machines the machining surface 28 of workpiece 14 for a brief amount of time before the electrode withdraws from the spark gap. FIG. 6 schematically illustrates the point at which the withdrawal of electrode 10 actually terminates the cutting pulse spark. As discussed previously, it is believed a substantial amount of debris removal occurs between FIG. 5 and FIG. 6, that is, during the second machining phase and machining termination phase when the cutting pulse spark is still engaged.

Figure 7:
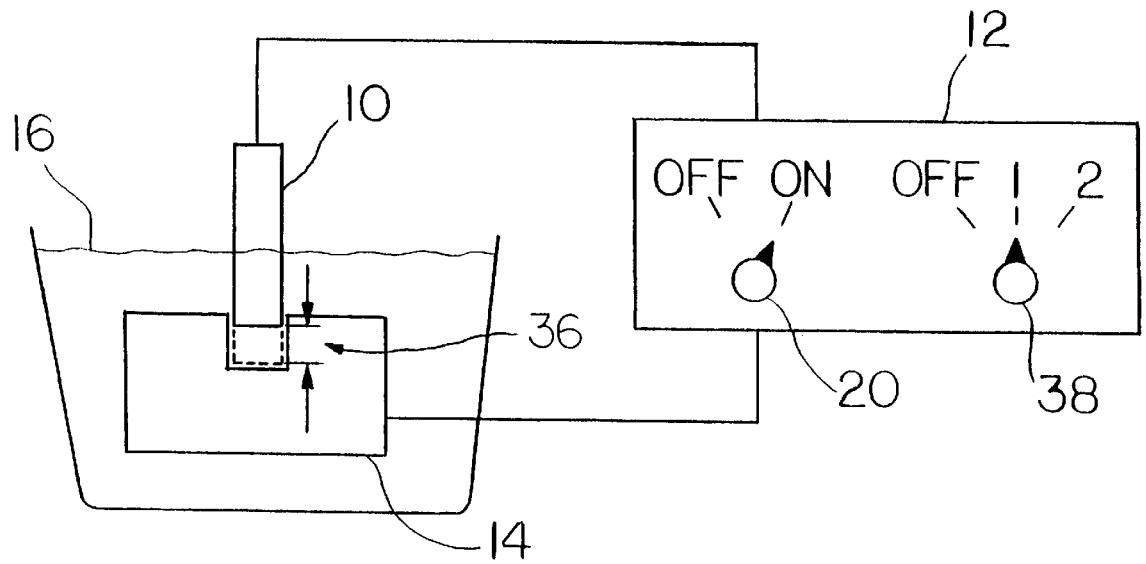
FIG. 7 is a schematic view illustrating the middle of the hydraulic flushing phase, wherein the electrode is withdrawn by a full stroke length from the machining surface.
Figure 8:
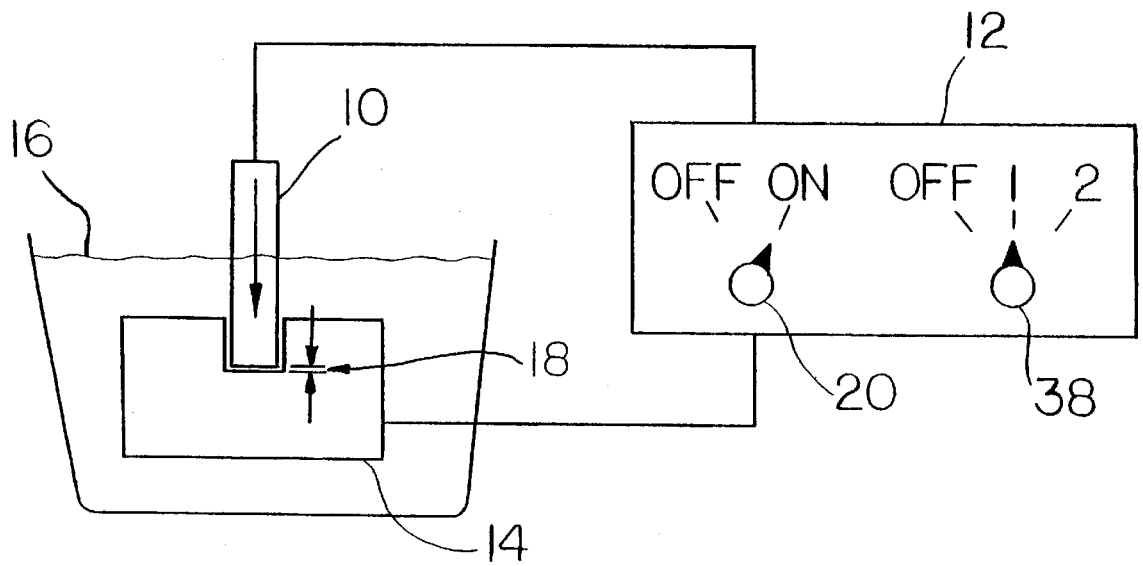
FIG. 8 is a schematic view illustrating the electrode reentering the spark gap in a position to start the multi-phase machining cycle.

Although the cutting pulse spark has terminated, electrode 10 continues to withdraw an additional length 36, as shown in FIG. 7. The withdrawal of electrode 10 just after termination of cutting pulse spark is the beginning of the hydraulic flushing phase of the first machining cycle. Once additional length 36 is reached, approximately 0.10 inch or more, a signal is sent to the servo controlled electrode to return it to distance 18, as shown in FIG. 8, in preparation for reestablishing the cutting pulse spark. Generally, distance 18 is the same distance between electrode 10 and machining surface 28 during the first machining phase. The return of electrode 10 marks the end of the hydraulic flushing phase. Hence, the motion of electrode 10 in FIG. 7 and FIG. 8 illustrate the hydraulic flushing phase of the first machining cycle.

Figure 9:
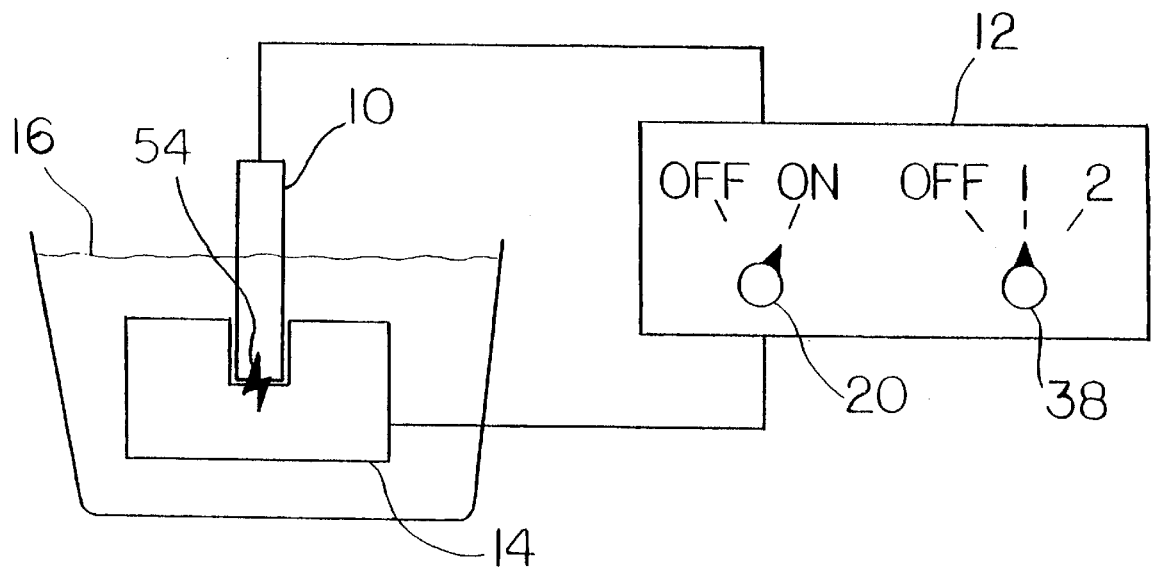
FIG. 9 is a schematic view illustrating the beginning of the reduced power machining phase of a multi-phase machining cycle.

Once electrode 10 is brought to within distance 18 from machining surface 28 of blind hole 26 of workpiece 14 the cutting pulse spark reestablishing phase is initiated where cutting pulse spark 54 is reestablished by pulse generator 12, as shown in FIG. 9, at a spark cycle average power level approximately equal to that in the first machining phase. Hence, FIG. 9 illustrates the cutting pulse spark reestablishing phase of the first machining cycle set by the first set of operating parameters of pulse generator 12. The first machining cycle then continuously repeats the first machining phase, second machining phase, machining termination phase, hydraulic flushing, and cutting pulse spark reestablishing phase as long as pulse flushing duty cycle switch 38 is in position "1" and pulse generator switch 20 is in the "on" position.

Typically, the operator leaves pulse flushing duty cycle switch 38 in position "1" as blind hole 26 continues to be machined by the cyclic repetitions of the first machining phase. However, if the rate of machining decreases substantially while operating in pulse flush duty cycle position "1", the operator then selects position "2". Position "2" overrides the first machining cycle with a second machining cycle. In the preferred embodiment of the present invention, the second machining cycle is identical to the first machining cycle, with the exception that the first spark cycle average power level and the on-time power level in the first machining phase are much lower.

The EDM unit, pulse generator 12, electrode 10 and power supply, with which the present invention is used, can by any one of a number of such devices, e.g., the "Pulsitron" EP 30 was manufactured by Eltee Pulsitron of West Caldwell, N.J.

In the preferred embodiment of the EDH method which has been selected for purposes of illustration, the EDM unit is hardwired to operate at a working gap voltage of 60 V and peak current of 10 A. The working gap voltage is maintained, as is well known in the art, by monitoring and adjusting the spark gap by servo control of the electrode. Table I lists the operating conditions of the present invention hardwired in the EDN unit for the initial set of operating conditions as described above. Table II lists the operating conditions of the present invention hardwired in the EDN unit for the first machining cycle as described above. Table III lists the operating conditions of the present invention hardwired in the EDN unit for the second machining cycle as described above.

TABLE I

Initial Set of Operating Conditions

Initial Machining Phase

| | |
|---|---|
| Working Gap Voltage | 60 (V) |
| Peak Current | 10 (A) |
| On-time | 80 (μs) |
| Off-time | 20 (μs) |
| Frequency | 10 (KHz) |
| Spark Duty Cycle | 80 (%) |
| First Spark Cycle Average Power Level | 480 (W) |

TABLE II

First Machining Cycle

First Machining Phase

| | |
|---|---|
| Working Gap Voltage | 60 (V) |
| Peak current | 10 (A) |
| On-time | 80 (μs) |
| Off-time | 150 (μs) |
| Frequency | 4.347 (KHz) |
| Spark Duty Cycle | 34.78 (%) |
| First Spark Cycle Average Power Level | 208.88 (W) |

Second Machining Phase

| | |
|---|---|
| Working Gap Voltage | 60 (V) |
| Peak Current | 10 (A) |
| On-time | 80 (μs) |
| Off-time | 20 (μs) |
| Frequency | 10 (Hz) |
| Spark Duty Cycle | 80 (%) |
| First Spark Cycle Average Power Level | 480 (W) |

TABLE III

First Machining Phase

| | |
|---|---|
| Working Gap Voltage | 60 (V) |
| Peak Current | 10 (A) |
| On-time | 3 (μs) |
| Off-time | 150 (μs) |
| Frequency | 6.535 (KHz) |
| Spark Duty Cycle | 2 (%) |
| First Spark Cycle Average Power Level | 12 (W) |

Second Machining Phase

| | |
|---|---|
| Working Gap Voltage | 60 (V) |
| Peak Current | 10 (A) |
| On-time | 80 (μs) |
| Off-time | 20 (μs) |
| Frequency | 10 (Hz) |
| Spark Duty Cycle | 80 (%) |
| First Spark Cycle Average Power Level | 480 (W) |

It is to be understood to those skilled in the art that spark cycle average power level referred to herein is determined by the parameters set in the pulse generator, e.g. on-time and off-time, peak current, and working gap voltage, and that the above operating conditions can be modified while still keeping within the true scope and spirit of the present invention. Hardwiring an EDM control system, according to the preferred embodiment of the present invention, by adjusting the off-time and/or on-time of the cutting pulse spark to change the spark cycle average power level, is merely an effective and inexpensive way of implementing the present invention. For instance, peak current or voltage could be raised, or lowered, in order to change the spark cycle average power during the various phases of the present invention to achieve the same results of EDN machining.

Figure 10:
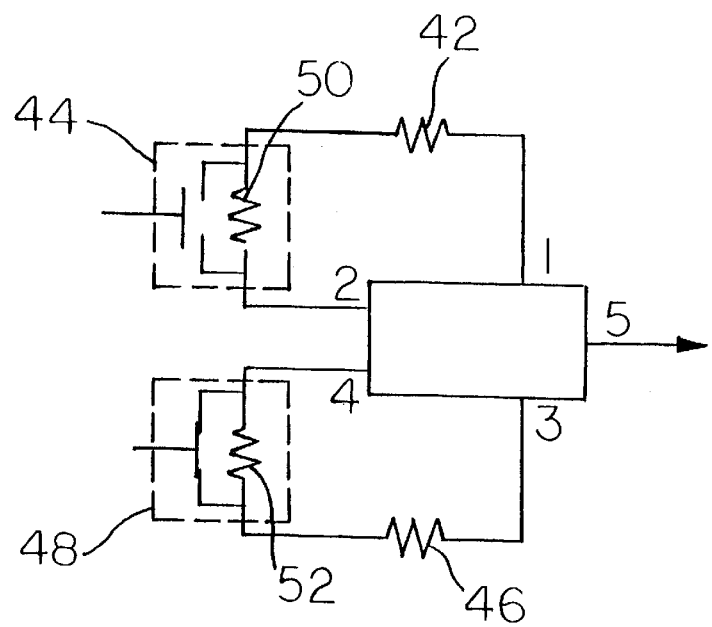
FIG. 10 is the hardwired electrical control schematic of an EDM cutting power pulse generator unit according to the present invention configured for the original machining operation as shown, for example, in FIG. 3.
Figure 11:
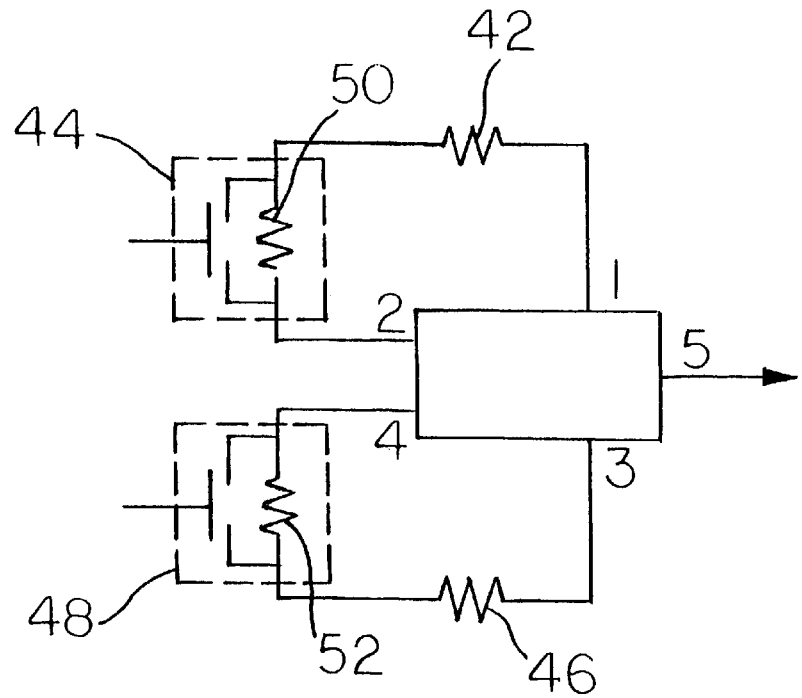
FIG. 11 is the hardwired electrical control schematic of FIG. 10 configured to operate in the reduced power machining phase, while operating in a multi-phase machining cycle.
Figure 12:
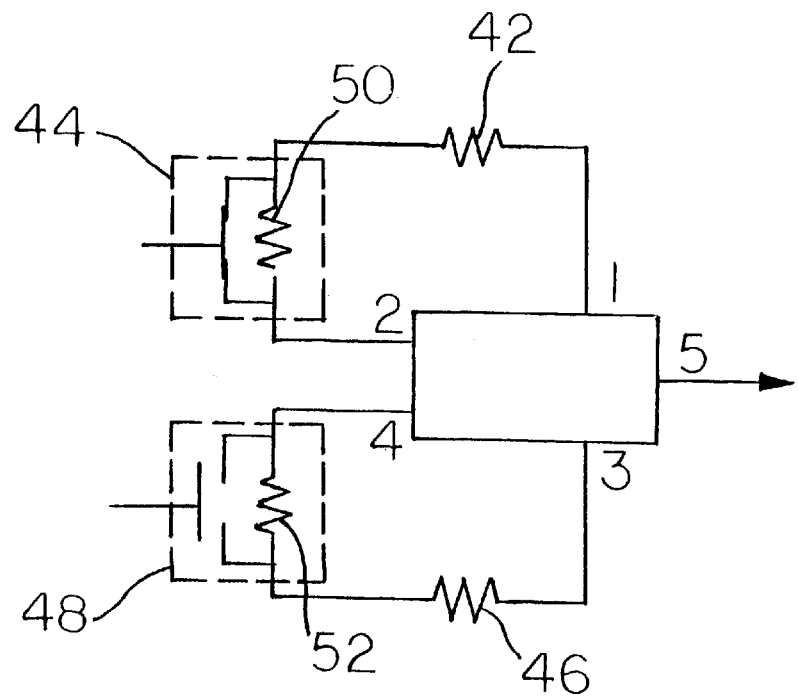
FIG. 12 is the hardwired electrical control schematic of FIG. 10 configured to operate in a further reduced power machining phase, while operating in a multi-phase machining cycle.

FIG. 10 through FIG. 12 illustrate the operation of one embodiment of a hardwired electrical control of an EDM unit according to the present invention. A conventional microprocessor or timer chip 40 has leads 1 and 2 forming an electrical path from chip 40 passing through Resistor 42 and on-time switch 44 and back to chip 40. Leads 3 and 4 form an electrical path from chip 40 passing through Resistor 46 and off-time switch 48, and back to chip 400 On-time switch 44 is connected in parallel with resistor R-on 50, and off-time switch 48 is connected in parallel with resistor R-off 52. Chip 40 also sends signals through lead 3 which is received at lead 4, and through lead 1 which is received at lead 2. Responsive to the signals received from leads 2 and 4, chip 40 sends output signals through lead 5 to the pulse generator which control the on- and off-times of the cutting spark in the spark gap.

The on-time duration of cutting pulse spark, in this embodiment, is established at one of two values depending upon the position of the switch 44. When switch 44 is open as in FIGS. 10 and 11, the current must flow through both resistors 42 and 50, and when switch 44 is closed the current flows through only resistor 42. Depending upon the signal which is received through lead 2 the on-time will be, for example, either 80 or 3 microseconds. The duration or period of the off-time of the cutting pulse spark is likewise established at one of two values by means of switch 48. When switch 48 is closed as in FIG. 10, the current only flows through resistor 46. When switch 48 is open as in FIGS. 11 and 12, the current flows through both resistors 46 and 52.

FIG. 10 shows the hardwired electrical control schematic as positioned during the initial machining phase with pulse generator switch 20 in the "on" position and pulse flushing duty cycle switch in the "off" position, as shown in FIG. 3. In FIG. 10, on-time switch 44 is in the open position so that the signal sent through lead 1 must pass through resistor R-on 50, and off-time switch 48 is in the closed position allowing the signal sent through lead 3 to effectively bypass resistor R-off 52. The combined resistance of Resistor 42 and resistor R-on 50 is selected to create a 80 microsecond delay in the charging of a timing circuit in the timer or computer chips. This delay sets the on-time of the cutting pulse spark during the initial machining phase. Resistor 46 is selected at a resistance value to similarly create a 20 microsecond delay in the timer. This delay sets the off-time of the cutting pulse spark during the initial machining phase. FIG. 10 thus illustrates a circuit which provides a cutting spark with an 80 microsecond on-time and a 20 microsecond off-time. In addition to illustrating the settings used, for example, in an initial machining phase, FIG. 10 also exemplifies the settings of a hardwired EDM unit according to the present invention when operated in the second machining phase of both the first and second machining cycles.

When pulse flushing duty cycle switch 38 is switched to the "1" position, as shown in FIG. 4, a first multi-phase machining cycle is initiated. FIG. 11 shows the hardwired electrical control schematic of an EDM unit according to the present invention as positioned, for example, in the first machining phase of a multi-phase first machining cycle. In FIG. 11, both on-time switch 44 and off-time switch 48 are in the open position. As in FIG. 10, the on-time delay is still 80 microseconds since on-time switch 44 remains open. With off-time switch 48 open, the signal traveling from lead 3 to lead 4 must pass through resistor 46 and resistor R-off 52. The combined resistance of resistor R-off 52 and resistor 46 is selected so that the delay in the timing circuit is 150 microseconds. FIG. 11 thus illustrates a circuit which provides a cutting spark with an 80 microsecond on-time and a 150 microsecond off-time. When the first multi-phase machining cycle operates in the second machining phase (terminal power pulse), off-time switch 48 is closed again, as in FIG. 10, returning the off-time to 20 microseconds.

When pulse flushing duty cycle switch 38 is switched to the "2" position, a second multi-phase machining cycle is initiated. FIG. 12 shows the hardwired electrical control schematic of an EDM unit according to the present invention configured for operation in the first machining phase of a second multi-phase machining cycle. In FIG. 12, on-time switch 44 is closed and off-time switch 48 is open. Since off-time switch 48 remains open, as in FIG. 11, the off-time of the cutting pulse spark remains at 150 microseconds. With on-time switch 44 closed, the signal traveling from lead 1 to lead 2 passes through resistor 42. The resistance of resistor 42 is selected to provide a 3 microsecond delay in the timer. FIG. 12 thus illustrates a circuit which provides a cutting spark with a 3 microsecond on-time and a 150 microsecond off-time. When the second multi-phase machining cycle operates in the second machining phase, on-time switch 44 is opened and off-time switch 48 is closed, as shown in FIG. 10, which establishes an on-time of 80 microseconds and an off-time of 20 microseconds during the second machining phase.

When operating in a multi-phase machining cycle, according to one embodiment of the present invention, an operator adjustable conventional timer circuit, not shown, controls the length or period of the first machining phase and initiates the machining termination phase. The initiation of the machine termination phase generally also initiates the second machining phase. When the electrode is to be physically withdrawn from the spark gap, signals are sent simultaneously to close off-time switch 48, and to the servo which controls electrode 10 to start its withdrawal from the spark gap. When electrode 10 withdraws to a point where cutting pulse spark is extinguished in the spark gap, the second machining phase and machining termination phase have ended, and hydraulic flushing is initiated as electrode 10 continues to withdraw.

Hydraulic flushing of machining surface 28 continues as electrode 10 is withdrawn to additional length 36, shown in FIG. 7, by the action of dielectric fluid 16 rushing into the volume left by withdrawn electrode 10. Once electrode 10 is withdrawn an additional length 36, a signal is sent to servo control electrode 10 to return to the spark gap, a signal is sent to off-time switch 48 to open, and a signal is sent to the timer circuit to reset. Hydraulic flushing is completed and a new cycle is started when electrode 10 returns to distance 18 with machining surface 28.

The cutting pulse spark is reestablished when electrode 10 returns to distance 18 with machining surface 28. The cutting pulse spark is reestablished at the first spark cycle average power level of the first machining phase. When operating in a first multi-phase machining cycle, the power level for the first machining phase will be, for example, that which results from the settings and circuit illustrated in FIG. 11. When operating in a second multi-phase machining cycle, the power level for the first machining phase will be, for example, that which results from the settings and circuit illustrated in FIG. 12. With the configuration illustrated in FIG. 11 the debris will be approximately the same average particle size as that produced by the configuration illustrated in FIG. 10, but the rate of debris generation will be reduced. In the configuration of FIG. 12 both the rate of production and average particle size, as well as the size of the cut, will be reduced as compared to that generated by the configuration of FIG. 10.

When the system is configured to operate in the first multiphase machining cycle, it will continue to so operate, cycling through the various phases, until either pulse generator switch 20 is turned "off", pulse flushing duty cycle switch is turned "off", or pulse flushing duty cycle switch is turned to position "2".

If the machining rate starts to drop below an acceptable rate while operating in the first multi-phase machining cycle, the operator switches the pulse flushing duty cycle switch 38 to position "2". Position "2" initiates a second multi-phase machining cycle, which has the same phases as are associated with position "1", except that the average cycle and on-time power levels are both reduced. The second machining cycle has its own first machining phase, second machining phase, machining termination phase, hydraulic flushing and cutting pulse spark reestablishing phase. When switched to position "2", off-time switch 48 is opened and on-time switch 44 is closed, as shown in FIG. 12, establishing a first machining phase with an on-time of 3 microseconds and an off-time of 150 microseconds. A conventional timer circuit associated with the second multi-phase machining cycle initiates the second machining phase and machining termination phase when the operator set period of time has elapsed. Similar to the first machining cycle, signals are sent simultaneously to off-time switch 48 to close, to on-time switch 44 to open, and to the servo controlled electrode 10 to withdraw. When the off-time switch 48 closes and on-time switch 44 opens, the second machining phase of the second machining cycle is initiated in the configuration illustrated, for example, in FIG. 10. When the signal sent to the servo which controls electrode 10 starts to withdraw electrode 10, the machining termination phase is initiated. When electrode 10 withdraws to a point where the cutting pulse spark is extinguished in the spark gap, the second machining phase and machining termination phase have ended, and hydraulic flushing is initiated as electrode 10 continues to withdraw away from the spark gap.

Hydraulic flushing of machining surface 28 continues as electrode 10 is withdrawn to additional length 36, shown, for example, in FIG. 7, by the action of dielectric fluid 16 rushing into the volume left by withdrawn electrode 10. Once the electrode is withdrawn additional length 36, a signal is sent to servo controlled electrode 10 to-return to distance 18 with the machining surface, a signal is sent to off-time switch 48 to open, a signal is sent to on-time switch 44 to close, and a signal is sent to the timer circuit to reset. Hydraulic flushing is completed when electrode 10 returns to distance 18 with machining surface 28.

When the system is configured to operate in the second multi-phase machining cycle, it will continue to so operate until pulse generator switch 20 is turned "off", pulse flushing duty cycle switch 38 is turned "off", or pulse flushing duty cycle switch 38 is turned to position "1".

Figure 13:
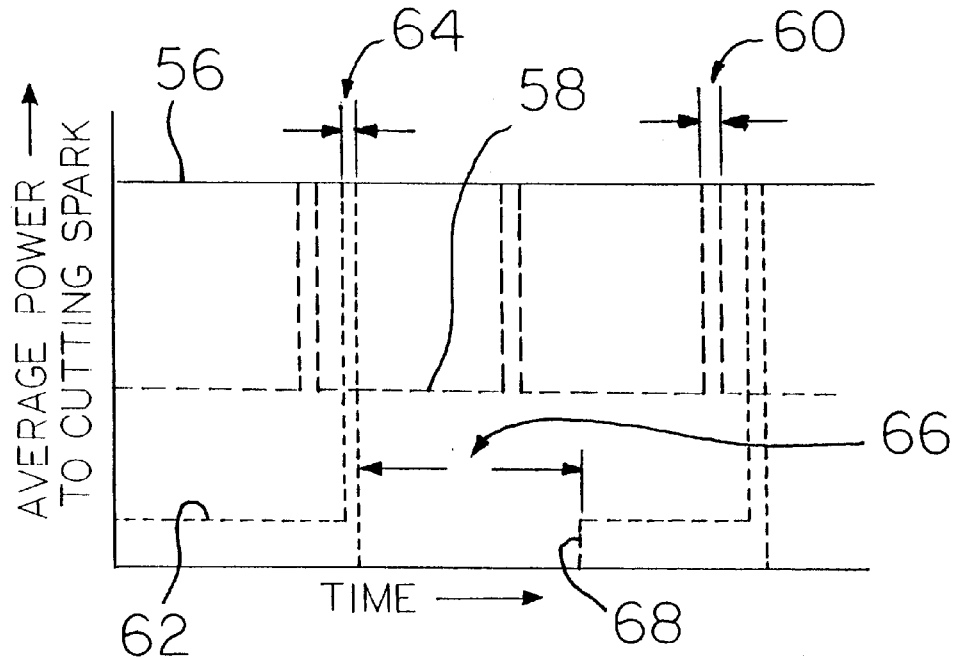
FIG. 13 is a plot of average power versus time for three different operating conditions.

According to the embodiment chosen for purposes of illustration, the EDM unit is hardwired with two separate machining cycles. It has been found that providing two machining cycles is sufficient for machining most cuts, although additional machining cycles can also be provided for additional flexibility, if desired. Computer controls can even provide an infinite number of machining cycles, if desired. The ability to manually and independently adjust the gap voltage, the current, the period of each machining phase, the frequency and amplitude of the electrode's movement into and out of the spark gap, coupled with two hardwired machining cycles, provides enough flexibility to accommodate substantially all EDM requirements Referring particularly to FIG. 13, three different superimposed plots of power cycles for three different operating conditions are illustrated (not to scale). The average power per machining cycle supplied to the cutting spark in the initial phase is illustrated by straight curve 56. There is no terminal power pulse and there is no mechanical interruption of the machining by mechanical withdrawal of the electrode from the spark gap. The respective on- and off-times which occur in every electrical cycle of the cutting spark are not illustrated, see, for example, FIG. 1.

Curve 58 represents a multi-phase machining cycle where there is no hydraulic flushing. A terminal power pulse 60 is applied at the end of the machining cycle. Terminal power pulse 60 briefly brings the power back up to the level illustrated by straight curve 56. At the end of terminal power pulse 60 the power immediately drops to the previous level, and the cycle repeats. The power never drops to zero. The respective lengths of the terminal power pulse 60 and the level portion of the curve can be established by the operator.

Figure 14:
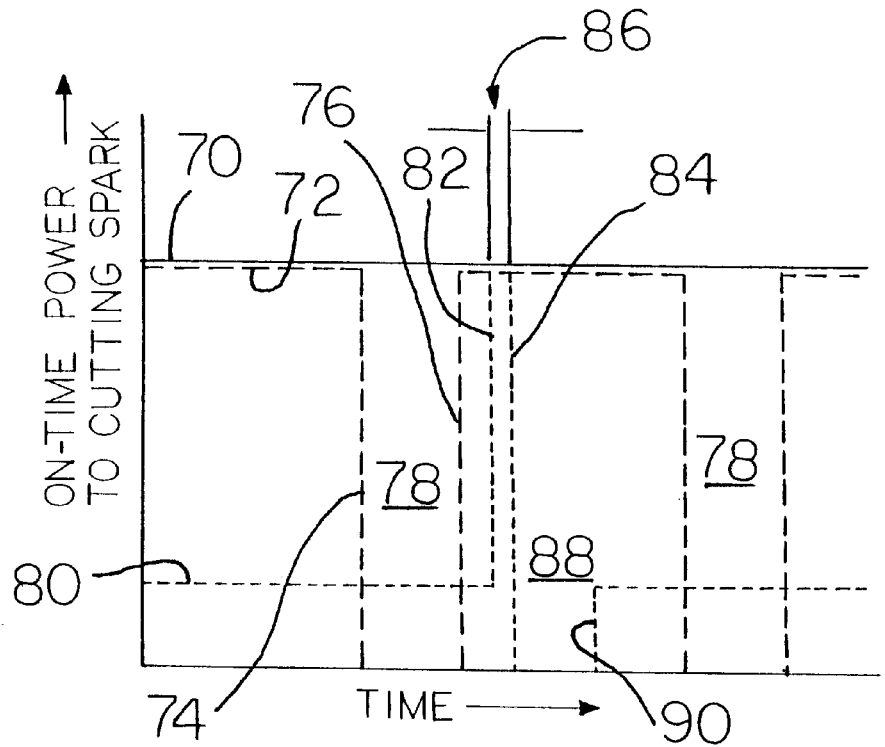
FIG. 14 is a plot of on-time power versus time for three different operating conditions.

Curve 62 illustrates a multi-phase machining cycle where the average power supplied to the cutting spark per machining cycle is reduced further from that illustrated by curve 58, and a terminal power pulse is applied at 64. The terminal power pulse briefly brings the power back up to that represented by straight curve 56. The power to the cutting spark goes to zero and stays there for some period of time 66 until the power is reapplied at 68, and the cycle begins to repeat. The interruption of power can be due to the mechanical stroking of the electrode in an out of the spark gap during a hydraulic flushing phase. The unpowered phase 66 can also be imposed by the operator without the use of hydraulic flushing. The length of each of these machining phases can be adjusted independently by the operator Referring particularly to FIG. 14, three different superimposed plots of on-time power cycles for three different operating conditions are illustrated (not to scale). The on-time power per machining cycle supplied to the cutting spark in the initial phase is illustrated by straight line 70. There is no terminal power pulse and there is no mechanical interruption of the machining by mechanical withdrawal of the electrode from the spark gap.

Curve 72 illustrates the on-time power supplied to a cutting spark in a multi-phase machining cycle. Curve 72 has been separated slightly from curve 70 for purposes of illustration. As will be understood by those skilled in the art, curves 70 and 72 actually lie closely on top of one another. The average power per cycle supplied in the phase illustrated by curve 72 is less than that supplied in the phase illustrated by curve 70, however, the on-time power supplied to the cutting spark is the same. Curves 70 and 72 lie on top of one another because this FIG. 14 only illustrates on-time power. Curve 72 is interrupted at 74 and the cutting spark is extinguished. There is no cutting spark in the spark gap for the period 78. When the spark is reignited at 76 the on-time power level goes back to the original value and the cycle begins to repeat. The period 78 may be caused by the mechanical withdrawal of the electrode from the spark gap or by operator set electronic control. The durations of these various phases can be adjusted independently by the operator.

In order to reduce the particle size of the debris, as well as the rate of production, the on-time power is reduced to the level shown by curve 80. A terminal power pulse is initiated at 82 with a duration of 86. The terminal power pulse is extinguished at 84 and the power goes to zero for a period of 88 until the cutting spark is reignited in the spark gap at 90. The duration 86 of the power pulse and the zero power period 88 can be determined by the mechanical movement of the electrode as it is withdrawn from the spark gap or by operator selected timing parameters. The on-time power must return to the level of curve 70, however briefly, in order to maintain the desired size and finish of the cut.

EXAMPLE

A hardened steel bolt (1 inch by ⅜ inch with 16 threads per inch) was selected as the workpiece. A Poco C3 electrode, size 0.011 by 0.293 by 4 inches long was selected. The workpiece was installed in an EDM machine with the electrode positioned to penetrate the bolt along its threaded diameter with the long side of the electrode oriented parallel to the longitudinal axis of the bolt. The electrode polarity was set to negative, and the setup was immersed in dielectric fluid. The operating conditions at various depths were as follows:

1. Depth Range 0.000–0.100 inches (quill movement, including electrode wear)
   Burning time 17 Seconds
   Total cumulative time 17 seconds
      Open Gap Voltage 100 Volts
      Working Gap Voltage 60 Volts
      Peak Cutting Current 5 Amps
      ON Time 60 microseconds
      OFF Time 20 microseconds
      Multi-Phase Machining Cycle OFF
      Hydraulic Flush OFF The radio frequency in the spark gap was heard to change and the progress of the quill towards the workpiece slowed and became unsteady at about 15 to 16 seconds operating time. Adjustments were immediately made to the operating parameters as shown in Step 2 below. The adjustments established a multi-phase cycle which included a reduced average power machining phase wherein the same on-time power level to the cutting spark was maintained but the average power per cycle was reduced, a hydraulic flushing phase in which the electrode was mechanically stroked in and out of the spark gap, and a terminal power pulse phase wherein the average power per cycle was returned to that which was used in Step 1.

2. Depth Range 0.100–0.150 inches (quill movement, including electrode wear)
   Burning time 20 Seconds
   Total cumulative time 37 seconds (17+20)
      Reduced Power Machining Phase ON for about 0.60 seconds
         Open Gap Voltage 100 Volts
         Working Gap Voltage 60 Volts
         Peak Cutting Current 10 Amps
         ON Time 60 microseconds
         OFF Time 150 microseconds
      Terminal Power Pulse Phase ON for approximately 0.005 to 0.015 seconds
         Open Gap Voltage 100 Volts
         Working Gap Voltage 60 Volts
         Peak Cutting Current 10 Amps
         ON Time 60 microseconds
         OFF Time 20 microseconds
      Hydraulic Flush ON (electrode mechanically stroked in and out of spark gap)
         Minimum Mechanical Lag Time Of Servo About 0.0025 Seconds
         Period Of Withdrawal Stroke About 0.040 Seconds (from sending of signal to servo to withdraw, to most remote point from workpiece)
         Minimum Period Of Reinsertion Stroke About 0.040 Seconds (from sending of signal to return, to reestablishment of cutting spark in the spark gap)

Electrode Retraction About 0.008 Inches (total length of path, including extraction and insertion, of about 0.016 inches).

The terminal power pulse was initiated, by reducing the off-time to 20 microseconds, at the same time that the signal was sent to the servo to withdraw the electrode from the spark gap. The terminal power pulse was applied instantaneously, however, the response of the servo lagged the receipt of the up signal. The cutting action of the terminal power pulse at the bottom of the hole was terminated by the withdrawal of the electrode from the spark gap. Power, at the level of that used in the terminal power pulse was, however, applied to the electrode for the entire withdrawal phase of the electrode stroke. The length of the terminal power pulse was thus determined by the mechanical movement of the electrode. When a signal was sent to the servo to return the electrode to the spark gap, the power level was reduced to what it had been previously. That is, the off-time was increased to 150 microseconds. The cutting spark was reignited at this reduced power level when the electrode entered the spark gap, and the automatic controls adjusted the position of the electrode within the spark gap to maintain the operator pre-selected operating conditions within the spark gap.

The terminal power pulse was only acting in the spark gap for a very small part of the period of the electrode retraction stroke. The gap between the walls of the hole and the sides of the electrode was approximately 0.001 inches. The width of the spark gap was less than the gap between the walls of the hole and the sides of the electrode. Thus, the spark gap was less than approximately 0.001 inches wide. The electrode had to travel considerably less than 0.001 inches before the cutting spark was extinguished in the spark gap. Based on the length and time of the out electrode stroke, and considering the mechanical lag of the servo which moved the electrode, the period during which the terminal power pulse acted within the spark gap was believed to be from approximately 0.005 to 0.015 seconds. This time will vary considerably from cycle to cycle because of the various conditions which may be present when the signal is given to the servo to withdraw the electrode from the spark gap. The automatic controls which accomplish the minute positional adjustments of the electrode within the spark gap, for example, may have just given the servo a down signal or an up signal. If the electrode is, for example, moving down when the signal to withdraw from the spark gap is issued, the mechanical inertia encountered in stopping and reversing the electrode may add as much as 0.010 seconds or more to the period of the terminal power pulse. Similarly, if the electrode is moving up when the withdrawal signal is received, the period of the terminal power pulse is considerably shortened Steps 3 through 9 were carried to the depths and during the times as shown below.

3. Depth Range 0.150–0.200 inches (quill movement, including electrode wear)

Burning time 23 seconds

Total cumulative time 60 seconds (17+20+23) The operating parameters were the same as in Step 2.

4. Depth Range 0.200–0.250 inches (quill movement, including electrode wear)

Burning time 30 seconds

Total cumulative time 90 seconds (17+20+23+30) The operating parameters were the same as in Step 2.

5. Depth Range 0.250–0.300 inches (quill movement, including electrode wear)

Burning time 35 seconds

Total cumulative time 125 seconds The operating parameters were the same as in Step 2.

6. Depth Range 0.300 0.350 inches (quill movement, including electrode wear)

Burning time 40 seconds

Total cumulative time 165 seconds The operating parameters were the same as in Step 2.

7. Depth Range 0.350–0.400 inches (quill movement, including electrode wear)

Burning time 42 seconds

Total cumulative time 207 seconds The operating parameters were the same as in Step 2.

8. Depth Range 0.400–0.450 inches (quill movement, including electrode wear)

Burning time 45 seconds

Total cumulative time 252 seconds The operating parameters were the same as in Step 2.

9. Depth Range 0.450–0.500 inches (quill movement, including electrode wear)

Burning time 12 seconds

Total cumulative time 264 seconds The operating parameters were the same as in Step 2.

The total cumulative burning time was less than about 4 and one half minutes. There was 33 percent electrode wear. A good clean diametric hole through the bolt was achieved at precisely the desired location. No hydraulic action was provided other than that caused by the movement of the electrode and applying the terminal power pulse. No side flushing of the blind hole, with the attendant risk of deflecting the thin electrode from its desired position, was used.

The length of the terminal power pulse was determined in this example by the mechanical lag time between the sending of the out signal to the servo and the actual movement of the electrode out of the spark gap. It is not necessary to rely upon the mechanical lag time to establish the period of the terminal power pulse. This can be adjusted by the operator independent of any movement of the electrode.

Repeating Step 2 of this example without stroking the electrode in and out of the spark gap requires that the operator set the lengths of the reduced power phase and the terminal power pulse phase, or that such lengths be programmed into the equipment. Since the cutting spark can not be terminated by the mechanical movement of the electrode if there is no such mechanical movement, the equipment is designed to permit the independent adjustment of the lengths of the reduced power phase and the terminal power pulse. In general, it has been found that most situations can be accommodated by permitting the length of the period of the reduced power phase to be adjusted from approximately 2 seconds to approximately 0.020 seconds, and that of the terminal power pulse from approximately 2 seconds to approximately 0.005 seconds. For most operating situations the terminal power pulse is held to approximately the minimum period required to accomplish the desired flushing and cut sizing. Reduced periods down to approximately 0.005 seconds are generally effective to accomplish the desired debris removal. The preferred period of the terminal power pulse generally ranges from approximately 0.005 to 0.100 seconds. This value is, however, preferably determined and optimized by monitoring one or more of the spark gap conditions of quill movement, radio frequency and gap voltage. For a given situation, where there is no hydraulic flushing, the operator determines and sets the appropriate period for both the reduced power phase and the terminal power pulse by monitoring at least the changes in the quill movement, and adjusting the lengths of the respective periods until the quill makes steady progress without chattering. When the cutting spark is simply reworking the debris in the spark gap the quill slows down or stops its inward movement and moves rapidly back and forth in very minute increments (it chatters). Preferably, other conditions such as changes in the radio frequency and gap voltage are also monitored. The radio frequency generated in the spark gap is amplified and fed through speakers so that it is audible to the operator. An audible change in the radio frequency is an indication of excessive debris build up in the spark gap, particularly carbonaceous debris. A change in the gap voltage which is not remedied by a minute outward adjustment of the quill also indicates the excessive build up of debris. Chattering of the quill is usually accompanied by an increase or decrease in the gap voltage.

In this example, the on-time power to the cutting spark was maintained by keeping all of the parameters which determine the on-time power constant in the initial and multi-phase machining cycles. If desired, the on-time power to the cutting spark in the multi-phase machining cycle can be provided by adjusting two or more of the on-time, gap voltage and peak current to provide the same wattage in the cutting spark as in the initial single phase machining stage.

Repetition of this example using a working gap voltage of 100 volts and the same current produces satisfactory results with a slightly larger hole.

Repeating this example with a work piece which is 1 inch thick requires that the power be reduced further. The on-time power to the cutting spark is reduced by reducing the on-time from 60 to 3 microseconds. The electrode retraction is increased to about 0.030 inches, and the period of the reduced power machining phase is reduced to about 0.30 seconds. The rate of machining decreases, however, monitoring the spark gap conditions of quill behavior, gap voltage and radio frequency shows that the spark gap is free of excessive debris, and machining continues. The average particle size of the debris produced at this reduced cutting power is substantially less than that produced in the original example. The debris produced in the original example settles quickly in the dielectric fluid whereas the debris produced at this reduced on-time power setting has the appearance of smoke and appears to float suspended in the dielectric fluid. Leaving the on-time power setting of the cutting spark in the terminal power pulse at the original level produces a hole of the desired size and finish.

While particularly advantageous in forming small, precise blind holes, the teachings of the present invention are also applicable to forming openings in workpieces utilizing other EDM operations where debris build up hampers the cutting, including, for example, wire cutting and hole popping. The present invention is particularly applicable to operations where the electrodes are so large or of such a configuration that the debris is difficult to clear from the cut.

What has been described are preferred embodiments in which modifications and changes may be made without departing from the true scope and spirit of the accompanying claims. Obviously many modifications and variations of the present invention are possible in light of the above teachings. It is therefore to be understood that, within the scope of the appended claims, the invention may be practiced otherwise than as specifically described.

What is claimed is:

1. A method of electrical discharge machining a machining surface in a workpiece by applying a cutting spark at a spark cycle average power level to an electrode, said electrode being submerged in a dielectric fluid and spaced from said machining surface by a spark gap, said method comprising:

entering a first machining phase by initiating a cutting pulse spark between said electrode and said machining surface through said spark gap at a first spark cycle average power level including a first on-time power level;

after a first predetermined period of time, entering a second machining phase by increasing said spark cycle average power level to a second spark cycle average power level including about said first on-time power level, said second spark cycle average power level being greater than said first spark cycle average power level, and terminating said second machining phase after a second predetermined period of time, the length of said second predetermined period of time being less than approximately one tenth that of said first predetermined period of time.

2. A method of claim 1, wherein said first machining phase, said second machining phase, and said terminating are repeated in cycles, each such cycle being a machining cycle.

3. A method of electrical discharge machining a workpiece with an electrode through a spark gap, comprising:

entering an initial machining phase by establishing a cutting pulse spark between said electrode and said machining surface through said spark gap at an initial spark cycle average power level, monitoring at least one spark gap condition of radio frequency, gap voltage, electrical current or electrode movement, continuing said initial machining phase until at least one of said spark gap conditions becomes unfavorable to continued machining;

discontinuing said initial machining phase and entering a first machining phase by reducing said spark cycle average power level to a first spark cycle average power level at which said spark gap conditions are favorable to continued machining, continuing said first machining phase for a predetermined first period;

after said first predetermined period, entering a second machining phase by increasing said spark cycle average power level to a second spark cycle average power level, said second spark cycle average power level being at least approximately one and one quarter of said first spark cycle average power level, continuing said second machining phase for a predetermined second period;

after said predetermined second period, terminating said second machining phase; and reentering said first machining phase.

4. A method of electrical discharge machining as described in claim 3, wherein said electrode is periodically physically withdrawn from and reinserted into said spark gap, and said second machining phase is terminated by withdrawing said electrode from said spark gap.

5. A method of claim 4 wherein the movement of said electrode out of and into said spark gap is controlled by a servo and said second machining phase is initiated at about the same time that a signal is sent to said servo to withdraw said electrode from said spark gap, whereby the length of said predetermined second period is approximately determined by the time required for said servo to respond to said signal.

6. A method of claim 3 wherein said working gap voltages are automatically maintained across said spark gap during said respective machining phases by minute adjustments of the electrode of less than approximately the width of said spark gap.

7. A method of claim 3, wherein said cutting pulse spark has an initial spark duty cycle of on-time and off-time in said initial machining phase, a first spark duty cycle of on-time and off-time in said first machining phase, a second spark duty cycle of on-time and off-time in said second machining phase, the off-time of said first spark duty cycle is at least twice the off-time of said initial spark duty cycle, and the second machining phase is initiated at the end of said first machining phase.

8. A method of claim 7, wherein the on-time in said first spark duty cycle is approximately the same as that in said initial spark duty cycle.

9. A method of claim 8, wherein said off-time of said first spark duty cycle is greater than said off-time of said initial spark duty cycle, and said off-time of said second spark duty cycle is approximately the same as said off-time of said initial spark duty cycle.

10. A method of electrical discharge machining a workpiece with an electrode submerged in a dielectric fluid and spaced from a machining surface of said workpiece by a spark gap, comprising:

entering an initial machining phase by establishing a cutting pulse spark between said electrode and said machining surface through said spark gap at an initial spark cycle average power level, monitoring at least one of the spark gap conditions of radio frequency, gap voltage, electrical current or electrode movement, continuing said initial machining phase until at least one of said spark gap conditions becomes unfavorable to continued machining;

discontinuing said initial machining phase and entering a first machining phase by reducing said spark cycle average power level to a first spark cycle average power level at which said spark gap conditions are favorable to continued machining, continuing said first machining phase for a predetermined first period;

after said first predetermined period, entering a second machining phase by increasing said spark cycle average power level to a second spark cycle average power level, said second spark cycle average power level being at least approximately one and one quarter said first spark cycle average power level, continuing said second machining phase for a predetermined second period;

after said predetermined second period, terminating said second machining phase; and reentering said first machining phase, said first machining phase, said second machining phase, and terminating said second machining phase comprising a first machining cycle;

continuing said first machining cycle until at least one of said spark gap conditions becomes unfavorable to continued machining;

terminating said first machining cycle and entering a second machining cycle, said second machining cycle including a third machining phase wherein said spark cycle average power level is reduced to a third spark cycle average power level at which said spark gap conditions are favorable to continued machining;

continuing said third machining phase for a predetermined third period, after said predetermined third period, entering said second machining phase;

continuing said second machining phase for a predetermined fourth period, after said predetermined fourth period, entering said third machining phase.

11. A method of claim 10 wherein said cutting pulse spark has an initial spark duty cycle of on-time and off-time in said initial machining phase, a first spark duty cycle of on-time and off-time in said first machining phase, a second spark duty cycle of on-time and off-time in said second machining phase, a third spark duty cycle of on-time and off-time in said third machining phase, the off-time of said first spark duty cycle being at least twice the off-time of said initial spark duty cycle, and the on-time in said third machining phase being less than the on-time in said first machining phase.

12. A method of electrical discharge machining a workpiece to form therein an opening of a predetermined size by applying a cutting pulse spark at a spark cycle average power level to a moveable electrode which is submerged in a dielectric fluid and spaced from a machining surface of said workpiece by a spark gap, said method comprising:

determining a sizing spark cycle average power level at which said opening with said predetermined size will be formed by said cutting pulse spark;

establishing a multi-phase machining cycle, said cycle comprising a reduced power machining phase, a terminal power pulse phase, and a spark gap flushing phase, said spark cycle average power level during said reduced power machining phase being less than said sizing spark cycle average power level, said spark cycle average power level during said terminal power pulse phase being sufficient to form said opening with said predetermined size, said spark gap flushing phase comprising withdrawing said electrode from said spark gap to extinguish said cutting spark, said terminal power pulse being initiated substantially instantaneously and approximately simultaneously with the initiation of said spark gap flushing phase.

13. A method of claim 12 wherein said spark gap flushing phase includes introducing said electrode back into said spark gap.

14. A method of claim 12 wherein said spark gap has a width and said electrode is withdrawn from said spark gap by a distance which is at least twice said width.

15. A method of electrical discharge machining a workpiece to form an opening therein by applying a cutting pulse spark at an on-time power level setting to an electrode which is submerged in a dielectric fluid and spaced from a machining surface of said workpiece by a spark gap, said method comprising the steps of:

determining a desired size for said opening;

monitoring at least one of the conditions of gap voltage, electrode movement, radio frequency or peak current in said spark gap;

applying a cutting pulse spark to said electrode at a first on-time power level setting, said first on-time power level setting being less than that required to produce said desired size, and machining said workpiece at said first on-time power level setting for a predetermined first period; and terminating machining at said first on-time power level setting and increasing said on-time power level setting to a second on-time power level setting, said second on-time power level setting being one at which said desired size is produced, and machining said workpiece at said second on-time power level setting for a predetermined second period, the respective lengths of said predetermined first and second periods being established by adjusting said respective lengths while monitoring at least one of said conditions until such monitored conditions become favorable to continued machining.

16. A method of claim 15 wherein the steps from applying a cutting pulse spark through terminating machining at said second on-time power level comprise one machining cycle, and said method comprises repeating said machining cycle.

17. A method of claim 16 wherein said electrode and said workpiece are moveable relative to one another and machining at said second power level is terminated by physically withdrawing said electrode from said spark gap, and the repeat of said machining cycle is commenced by physically advancing said electrode into said spark gap.

* * * * *